(12) United States Patent
Jing et al.

(10) Patent No.: US 12,097,738 B2
(45) Date of Patent: Sep. 24, 2024

(54) EXPLOITATION OF STATE-COUPLING, DISTURBANCE, AND NONLINEARITIES FOR SUSPENSION SYSTEM CONTROL

(71) Applicant: City University of Hong Kong, Kowloon (HK)

(72) Inventors: Xingjian Jing, Shatin (HK); Menghua Zhang, Shandong (CN)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 198 days.

(21) Appl. No.: 17/809,316

(22) Filed: Jun. 28, 2022

(65) Prior Publication Data

US 2023/0415537 A1    Dec. 28, 2023

(51) Int. Cl.
*B60G 17/018* (2006.01)

(52) U.S. Cl.
CPC .... *B60G 17/0182* (2013.01); *B60G 2600/124* (2013.01); *B60G 2600/17* (2013.01);
(Continued)

(58) Field of Classification Search
CPC .............. B60G 17/018; B60G 17/0182; B60G 2204/62; B60G 2600/124; B60G 2600/17;
(Continued)

(56) References Cited

U.S. PATENT DOCUMENTS 10,875,375 B2 * 12/2020 Giovanardi ........... F16F 15/002

FOREIGN PATENT DOCUMENTS

CN    113467233 A  *  10/2021

OTHER PUBLICATIONS

M. S. Lathkar, P. D. Shendge, and S. B. Phadke, "Active control of uncertain seat suspension system based on a state and disturbance observer," IEEE Transactions on Systems, Man, and Cybernetics, vol. 50, No. 3, pp. 840-850, Mar. 2020.
(Continued)

*Primary Examiner* — Hung Q Nguyen
*Assistant Examiner* — Mark L. Greene
(74) *Attorney, Agent, or Firm* — Amin, Turocy & Watson, LLP

(57) ABSTRACT

One or more systems, methods and/or non-transitory, machine-readable mediums are described herein for controlling a suspension system. An active suspension control system can comprise a memory that stores executable components, and a processor, coupled to the memory, that executes or facilitates execution of the executable components comprising a dynamics model generator that generates a bioinspired dynamics model and determines nonlinear dynamics for nonlinear suppression of vibration of an active suspension system, a fuzzy disturbance observer component that determines a lumped disturbance to the active suspension system by employing fuzzy variables absent determination of exact physical parameters of the active suspension system, and a controller that applies respective outputs of the dynamics model generator and the fuzzy disturbance observer component, in combination with a non-cancelled state-coupling term, to control the active suspension system to thereby cause the nonlinear suppression of the vibration of the active suspension system.

20 Claims, 12 Drawing Sheets

(52) U.S. Cl.
CPC ............... B60G 2600/182 (2013.01); B60G 2600/1872 (2013.01); B60G 2600/1879 (2013.01)

(58) Field of Classification Search
CPC ...... B60G 2600/182; B60G 2600/1872; B60G 2600/1873; B60G 2600/1879; B60G 2600/21
See application file for complete search history.

(56) References Cited

OTHER PUBLICATIONS

X. Yin, Z. Li, and I. V. Kolmanovsky, "Distributed state estimation for linear systems with application for full-car active suspension systems," IEEE Transactions on Industrial Electronics, vol. 68, No. 2, pp. 1615-1625, Feb. 2021.
J. Na, Y. Huang, X. Wu, S. Su, and G. Li, "Adaptive finite-time fuzzy control of nonlinear active suspension systems with input delay," IEEE Transactions on Cybernetics, vol. 50, No. 6, pp. 2639-2650, Jun. 2020.
S. Formentin and A. Karimi, "A data-driven approach to mixed-sensitivity control with application to an active suspension system," IEEE Transactions on Industrial Informatics, vol. 9, No. 4, pp. 2293-2300, Nov. 2013.
T. Wang and Y. Li, "Neural-network adaptive output-feedback saturation control for uncertain active suspension systems," IEEE Transactions on Cybernetics, in press, DOI: 10.1109/TCYB.2020.3001581, Jun. 30, 2020.
H. Li, X. Jing, H. K. La, and P. Shi, "Fuzzy sampled-data control for uncertain vehicle suspension systems," IEEE Transactions on Cybernetics, vol. 44, No. 7, pp. 1111-1126, Jul. 2014.
H. Gao, J. Lam, and C. Wang, "Multi-objective control of vehicle active suspension systems via load-dependent controllers," Journal of Sound and Vibration, vol. 290, No. 3-5, pp. 654-675, Mar. 2006.
W. Sun, H. Gao, and O. Kaynak, "Finite frequency H∞ control for vehicle active suspension systems," IEEE Transactions on Control Systems Technology, vol. 19, No. 2, pp. 416-422, Mar. 2011.
R. Wang, H. R. Karimi, and N. Chen, "Robust fault-tolerant H∞ control of active suspension systems with finite-frequency constraint," Mechanical Systems and Signal Processing, vol. 62-63, pp. 341-355, Oct. 2015.
S. Yin and Z. Huang, "Performance monitoring for vehicle suspension system via fuzzy positivistic c-means clustering based on accelerometer measurements," IEEE/ASME Transactions on Mechatronics, vol. 20, No. 5, pp. 2613-2620, Oct. 2015.
Q. Zeng, Y. Liu, and L. Liu, "Adaptive vehicle stability control of half-car active suspension systems with partial performance constraints," IEEE Transactions on Systems, Man, and Cybernetics: Systems, vol. 51, No. 3, pp. 1704-1714, Mar. 2021.
Z. Li, L. Zheng, Y. Ren, Y. Li, and Z. Xiong, "Multi-objective optimization of active suspension system in electric vehicle with In-Wheel-Motor against the negative electromechanical coupling effects," Mechanical Systems and Signal Processing, vol. 116, pp. 545-565, Feb. 2019.
Y. Liu and H. Chen, "Adaptive sliding mode control for uncertain active suspension systems with prescribed performance," IEEE Transactions on Systems, Man, and Cybernetics: Systems, vol. 51, No. 10, pp. 6414-6422, Oct. 2021.
Y. Liu, Q. Zeng, S. Tong, C. L. Philip Chen, and L. Liu, "Adaptive neural network control for active suspension systems with time-varying vertical displacement and speed constraints," IEEE Transactions on Industrial Electronics, vol. 66, No. 12, pp. 9458-9466, Dec. 2019.
Z. Fei, X. Wang, M. Liu, and J. Yu, "Reliable control for vehicle active suspension systems under event-triggered scheme with frequency range limitation," IEEE Transactions on Systems, Man, and Cybernetics, vol. 51, No. 3, pp. 1630-1641, Mar. 2021.
V. S. Deshpande, B. Mohan, P. D. Shendge, and S. B. Phadke, "Disturbance observer based sliding mode control of active suspension systems," Journal of Sound and Vibration, vol. 333, No. 11, pp. 2281-2296, May 2014.
H. Pan, W. Sun, H. Gao, T. Hayat, and F. Alsaadi, "Nonlinear tracking control based on extended state observer for vehicle active suspensions with performance constraints," Mechatronics, vol. 30, pp. 363-370, Sep. 2015.
D. Ginoya, P. D. Shendge, and S. B. Phadke, "Sliding mode control for mismatched uncertain systems using an extended disturbance observer," IEEE Transactions on Industrial Electronics, vol. 61, No. 4, pp. 1983-1992, Apr. 2014.
Z. Li, C. Su, L. Wang, Z. Chen, and T. Chai, "Nonlinear disturbance observer-based control design for a robotic exoskeleton incorporating fuzzy approximation," IEEE Transactions on Industrial Electronics, vol. 62, No. 9, pp. 5763-5775, Sep. 2015.
Z. Guo, J. Guo, J. Zhou, and J. Chang, "Robust tracking for hypersonic reentry vehicles via disturbance estimation-triggered control," IEEE Transactions on Aerospace and Electronic Systems, vol. 56, No. 2, pp. 1279-1289, Apr. 2020.
N. Yagiz, Y. Hacioglu, and Y. Taskin, "Fuzzy sliding-mode control of active suspensions," IEEE Transactions on Industrial Electronics, vol. 55, No. 11, pp. 3883-3890, Nov. 2008.
J. J. Rath, M. Defoort, H. R. Karimi, and K. C. Veluvolu, "Output feedback active suspension control with higher order terminal sliding mode," IEEE Transactions on Industrial Electronics, vol. 64, No. 2, pp. 1392-1403, Feb. 2017.
J. J. Rath, M. Defoort, C. Sentouh, H. R. Karimi, and K. C. Veluvolu, "Output constrained robust sliding mode based nonlinear active suspension control," IEEE Transactions on Industrial Electronics, vol. 67, No. 12, pp. 10652-10662, Mar. 2020.
S. Yan, W. Sun, F. He, and J. Yao, "Adaptive fault detection and isolation for active suspension systems with model uncertainties," IEEE Transactions on Reliability, vol. 68, No. 3, pp. 927-937, Sep. 2019.
P. Li, Y. Wu, X. Sun, and Z. Lang, "Gain-scheduled control of linear differential inclusions subject to actuator saturation," IEEE Transactions on Industrial Electronics, vol. 66, No. 10, pp. 8051-8059, Oct. 2019.
H. Taghavifar, A. Mardani, C. Hu, and Y. Qin, "Adaptive robust nonlinear active suspension control using an observer-based modified sliding mode interval type-2 fuzzy neural network," IEEE Transactions on Intelligent Vehicles, vol. 5, No. 1, pp. 53-62, Mar. 2020.
Z. Guo, J. Zhou, J. Guo, J. Cieslak, and J. Chang, "Coupling-characterization-based robust attitude control scheme for hypersonic vehicles," IEEE Transactions on Industrial Electronics, vol. 64, No. 8, pp. 6350-6361, Aug. 2017.
Z. Guo, Q. Ma, J. Guo, B. Zhao, and J. Zhou, "Performance-involved coupling effect-triggered scheme for robust attitude control of HRV," IEEE Transactions on Mechatronics, vol. 25, No. 3, pp. 1288-1298, Jun. 2020.
H. Pan, X. Jing, W. Sun, and H. Gao, "A bioinspired dynamics-based adaptive tracking control for nonlinear suspension systems," IEEE Transactions on Control Systems Technology, vol. 26, No. 3, pp. 903-914, May 2018.
M. Zhang and X. Jing, "A bioinspired dynamics-based adaptive fuzzy SMC method for half-car active suspension systems with input dead zones and saturations," IEEE Transactions on Cybernetics, vol. 51, No. 4, pp. 1743-1755, Apr. 2021.
J. Li, X. Jing, Z. Li, and X. Huang, "Fuzzy adaptive control for nonlinear suspension systems based on a bioinspired reference model with deliberately designed nonlinear damping," IEEE Transactions on Industrial Electronics, vol. 66, No. 11, pp. 8713-8723, Nov. 2019.
Z. Wu, X. Jing, J. Bian, F. Li, and R. Allen, "Vibration isolation by exploring bioinspired structural nonlinearity," Bioinspiration and Biomimetics, vol. 10, No. 5, Art. No. 056015, Oct. 2015.
W. R. Soest, Q. P. Chu, and J. A. Mulder, "Combined feedback linearization and constrained model predictive control for entry flight," Journal of Guidance, Control, and Dynamics, vol. 29, No. 2, pp. 427-434, Mar.-Apr. 2006.

(56) References Cited

OTHER PUBLICATIONS

W. Kim, "A fuzzy disturbance observer and its application to control," IEEE Transactions on Fuzzy Systems, vol. 10, No. 1, pp. 77-84, Feb. 2002.

Z. Guo, J. Guo, J. Zhou, J. Zhao, and B. Zhao, "Reentry attitude tracking via coupling effect-triggered control subjected to bounded uncertainties," International Journal of Systems Science, vol. 49, No. 12, pp. 2571-2585, Aug. 2018.

X. Su and Y. Jia, "Self-scheduled robust decoupling control with H-infinity performance of hypersonic vehicles," Systems and Control Letters, vol. 70, pp. 38-48, Aug. 2014.

N. Sun, Y. Fang, and H. Chen, "Tracking control for magnetic-suspension systems with online unknown mass dentification," Control Engineering Practice, vol. 58, pp. 242-253, Jan. 2017.

H. K. Khalil, Nonlinear Systems, 3rd ed. Englewood Cliffs, NJ, USA: Prentice-Hall, 2002, pp. 1-191.

X. Zhao, X. Wang, L. Ma, and G. Zong, "Fuzzy approximation based asymptotic tracking control for a class of uncertain switched nonlinear systems," IEEE Transactions on Fuzzy Systems, vol. 28, No. 4, pp. 632-644, Apr. 2020.

M. Zhang, X. Jing, and G. Wang, "Bioinspired nonlinear dynamics-based adaptive neural network control for vehicle suspension systems with uncertain/unknown dynamics and input delay," IEEE Transactions on Industrial Electronics, vol. 68, No. 12, 12646-12656, Dec. 2021.

* cited by examiner

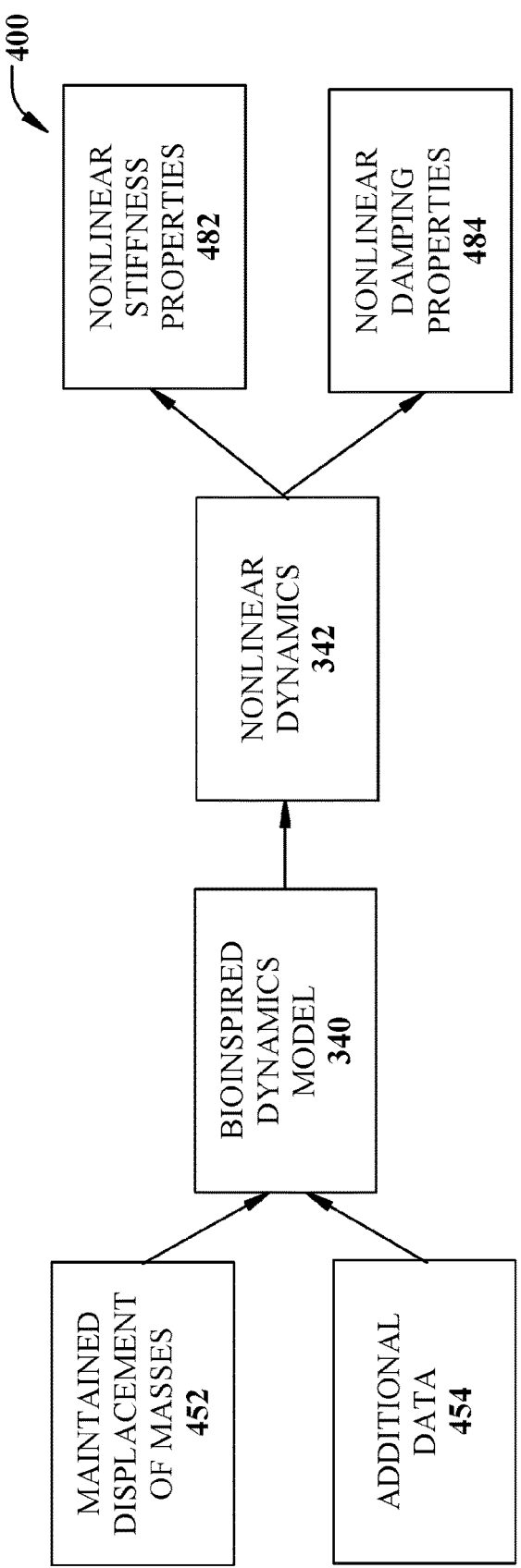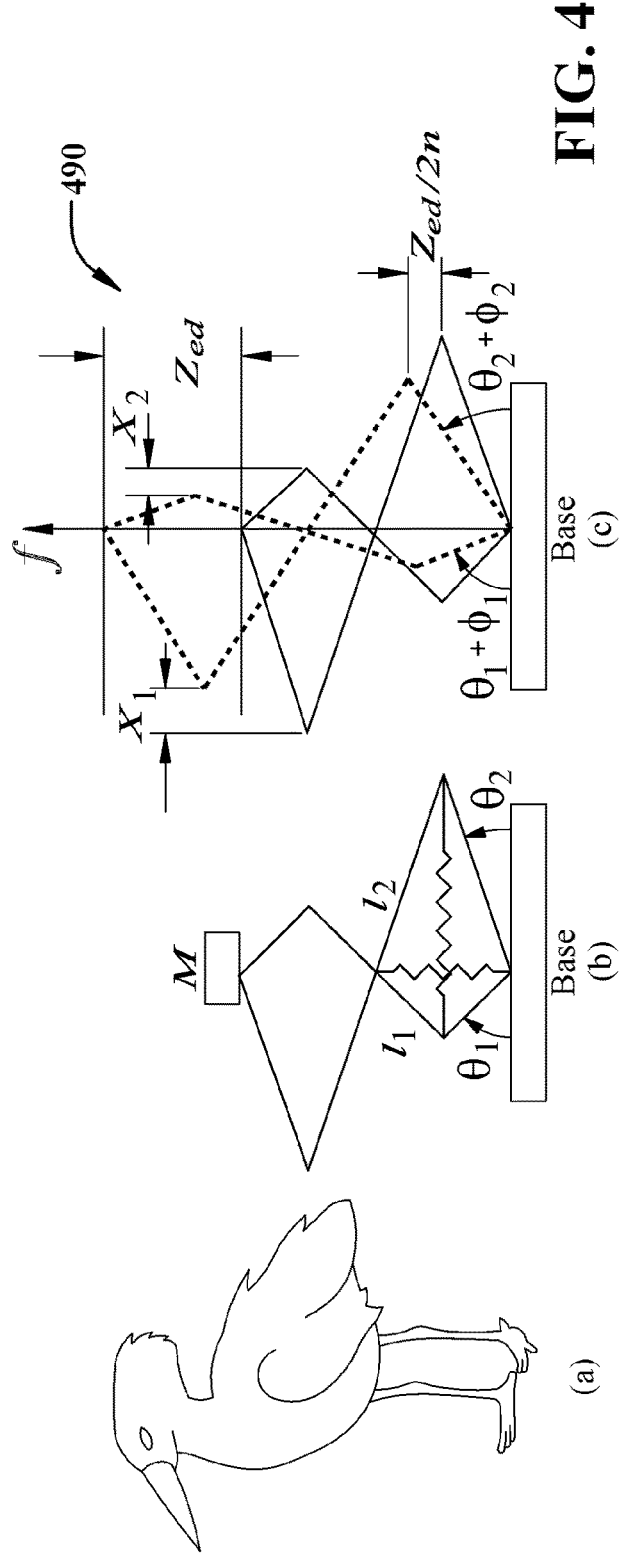
FIG. 4

EXPLOITATION OF STATE-COUPLING, DISTURBANCE, AND NONLINEARITIES FOR SUSPENSION SYSTEM CONTROL

BACKGROUND

Vehicle suspension systems exert an influence on ride comfort, vehicle stability and road handling. Active suspension systems can present vibration isolation performance when a vehicle suffers from irregular road profiles.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later.

According to an embodiment, an active suspension control system can comprise a memory that stores executable components, and a processor, coupled to the memory, that executes or facilitates execution of the executable components comprising a dynamics model generator that generates a bioinspired dynamics model and determines nonlinear dynamics for nonlinear suppression of vibration of an active suspension system, a fuzzy disturbance observer component that determines a lumped disturbance to the active suspension system by employing fuzzy variables absent determination of exact physical parameters of the active suspension system, and a controller that applies respective outputs of the dynamics model generator and the fuzzy disturbance observer, in combination with a non-cancelled state-coupling term, to control the active suspension system to thereby cause the nonlinear suppression of the vibration of the active suspension system.

According to another embodiment, a non-transitory machine-readable medium, can comprise executable instructions that, when executed by a processor facilitate performance of operations, comprising employing nonlinear dynamics for nonlinearly suppressing vibration of an active suspension system and to generate an ideal output tracking trajectory of the active suspension system, generating both disturbance and state-coupling effect indicators for the active suspension system, relating the disturbance and state-coupling effect indicators to one or more effects of the disturbance and state-coupling effect indicators on the active suspension system, where the disturbance and state-coupling effect indicators have not been eliminated via control of the active suspensions system, and controlling the active suspension system based on the nonlinear dynamics and based on the disturbance and state-coupling effect indicators.

According to yet another embodiment, a method can comprise employing, by a system comprising a processor, nonlinear dynamics usable to nonlinearly suppress vibration of an active suspension system, analyzing, by the system, a state-coupling effect of the active suspension system by relating amplitude and directionality, of disturbances to the active suspension system, to a tracking control cooperating with the active suspension system, and controlling, by the system, the active suspension system to thereby suppress the vibration of the active suspension system, based on the nonlinear dynamics and a non-cancelled state-coupling term that is output from the state-coupling effect analysis.

An advantage of the aforementioned system, non-transitory machine-readable medium, and/or method can be better ride comfort in a desired frequency range and in transient response. The control effort can be small in amplitude and smoother in the control signal of less high frequency components. Energy cost can be reduced, such as up to 80% as compared to existing frameworks. Further, physical constraints, including suspension space and dynamic tire load, can be confined to permitted and/or standard-based scopes.

DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout.

FIG. 4 illustrates a schematic of one or more nonlinear dynamics processes and/or functions of the active suspension control system of FIG. 2, in accordance with one or more embodiments described herein.

DETAILED DESCRIPTION

Figure 1:
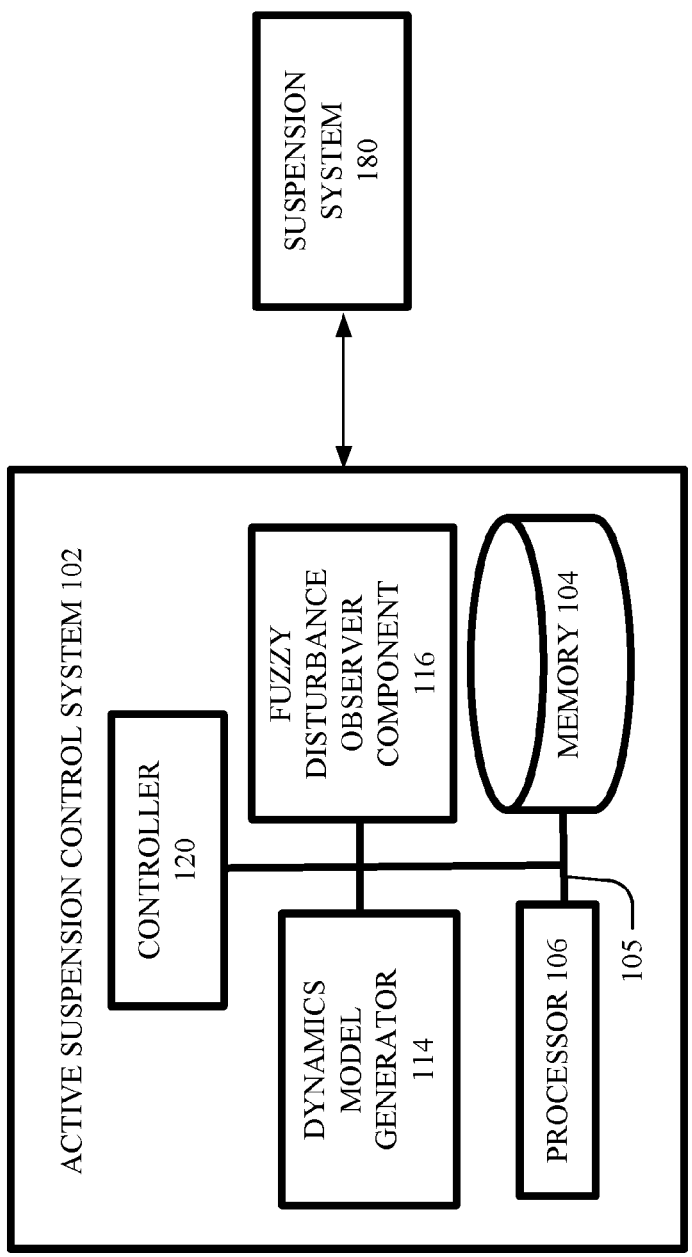
FIG. 1 illustrates an exemplary diagram of an active suspension control system, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

Overview

Control methods for active suspension systems can employ both linear and nonlinear methods, with existing control problems comprising, but not being limited to, unavoidable disturbance (parametric uncertainty, unmodeled uncertainty, and external disturbance), inherent nonlinear coupling effect, energy consumption, and the like. Indeed, existing techniques, systems, methods and frameworks have one or more deficiencies for addressing uncertainties, state-coupling and/or inherent nonlinearities.

To account for one or more of these deficiencies, one or more embodiment described herein provide a framework for considering uncertainty, state-coupling and/or inherent nonlinearity in active suspension control, while also employing beneficial effects of one or more of these aspects. The approach can provide an energy-saving and robust control method by introducing potential positive effects incurred by state-coupling, disturbance and/or nonlinearity to achieve a better control system than as provided by existing techniques.

Specifically, in one or more frameworks described herein, the lumped disturbance, including parametric uncertainty, unmodeled uncertainty, and external disturbance, can be accurately estimated by a fuzzy disturbance observer. Then, a robust controller can be designed and/or employed on the basis of the evaluation of the potential influence from state-coupling, disturbance, and nonlinearity. The rigorous stability and convergence can be carried out via Lyapunov techniques.

Generally, one or more frameworks discussed herein can employ a dynamics model generator, a fuzzy disturbance observer component, a state-coupling effect indicator component, and a controller to assist and/or control a suspension system, such as an active suspension system.

It is appreciated that the active suspension system can be employed on any vehicle, robot, moving platform, moving member and/or the like, and is not limited to on-road vehicles.

To deal with the parametric/unmodeled uncertainties and external disturbances, a fuzzy disturbance observer component is employed. As a consequence, the proposed controller can function absent exact values of one or more system parameters (such as, sprung/unsprung masses, stiffness and damping coefficients), which can improve the robustness of the overall active suspension control system.

A state-coupling effect indicator component can be introduced to analyze the influence of the state-coupling on active suspension systems. With this, one or more harmful state-coupling effects can be cancelled out while one or more beneficial effects can be retained/maintained for achieving better tracking control performance and/or stability.

A disturbance effect indicator, such as of the fuzzy disturbance observer component, can be employed, based on whether the direction of the disturbance is within the expected motion, which can be used to distinguish the beneficial effect from the bad one for further improving the tracking performance.

To address inherent nonlinearities of suspension systems, the control performance can be improved by means of purposely employing desirable bioinspired nonlinear stiffness and damping qualities such that the positive effect from inherent nonlinearity can be well employed while the negative effect can be suppressed. In this way, the proposed robust tracking control method can foster ride comfort but with less energy cost due to only negative nonlinear response being cancelled with external control efforts.

In view of the above, the proposed control methods cannot only effectively suppress transient response of vehicle suspensions but also save energy cost in active control effort, in part due to only the negative dynamic response from disturbance, state-coupling and/or nonlinearity being suppressed while the positive effects thereof can be well and innovatively employed.

Example Embodiments

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, one or more devices, systems and/or apparatuses thereof can further comprise one or more computer and/or computing-based elements described herein with reference to an operating environment, such as the operating environment 1100 illustrated at FIG. 11. In one or more described embodiments, computer and/or computing-based elements can be used in connection with implementing one or more of the systems, devices, apparatuses and/or computer-implemented operations shown and/or described in connection with one or more figures described herein.

As used herein, the terms "entity", "requesting entity" and "user entity" can refer to a machine, device, component, hardware, software, smart device and/or human.

As used herein, "data" can comprise metadata.

As used herein, "use" can comprise access to.

As used herein, "cost" can refer to time, money, power, storage, memory, bandwidth, manual labor and/or the like.

Turning now to the figures, one or more embodiments described herein can include one or more devices, systems, apparatuses and/or system-implemented methods that can enable a process to control a suspension system, such as an active suspension system. Generally, the one or more embodiments can provide an efficient, reliable and versatile framework for designing, testing, and/or implementing such active suspension control.

Looking first to FIG. 1, a non-limiting system 100 is illustrated that can comprise one or more devices, systems, and/or apparatuses that can enable a process to control and/or assist control of a suspension system 180, in accordance with one or more embodiments described herein. While referring here to one or more processes, facilitations, and/or uses of the non-limiting system 100, description provided herein, both above and below, also can be relevant to one or more other non-limiting systems described herein, such as the non-limiting system 200, to be described below in detail.

The non-limiting system 100 can enable both a process to eliminate undesirable variables such as disturbances, non-linearities and/or state-coupling effects, while also employing a process to use and maintain one or more positive disturbances, nonlinearities and/or state-coupling effect. As illustrated, the non-limiting system 100 can comprise an active suspension control system 102 comprising a processor 106, memory 104, bus 105, dynamics model generator 114, fuzzy disturbance observer component 116, and/or controller 120. Generally, the dynamics model generator 114 can generate a bioinspired dynamics model and determine nonlinear dynamics for nonlinear suppression of vibration of an active suspension system 180. Generally, the fuzzy disturbance observer component 116 determine a lumped disturbance to the active suspension system 180 by employing fuzzy variables absent determination of exact physical parameters of the active suspension system 180. The controller 120 can generally apply respective outputs of the dynamics model generator 114 and the fuzzy disturbance observer component 116, in combination with a non-cancelled state-coupling term, to control the active suspension system 180 to thereby cause the nonlinear suppression of the vibration of the active suspension system 180. In one or more embodiments, the controller 120 can be separate from, but communicate with, the active suspension control system 102.

One or more aspects of a component (e.g., the dynamics model generator 114, fuzzy disturbance observer component 116, and/or controller 120) can be employed separately and/or in combination, such as employing one or more of the memory 104 or the processor 106. Additionally, and/or alternatively, the processor 106 can execute one or more program instructions to cause the processor 106 to perform one or more operations by these components. The bus 105 can enable local communication between the elements of the active suspension control system 102.

Figure 2:
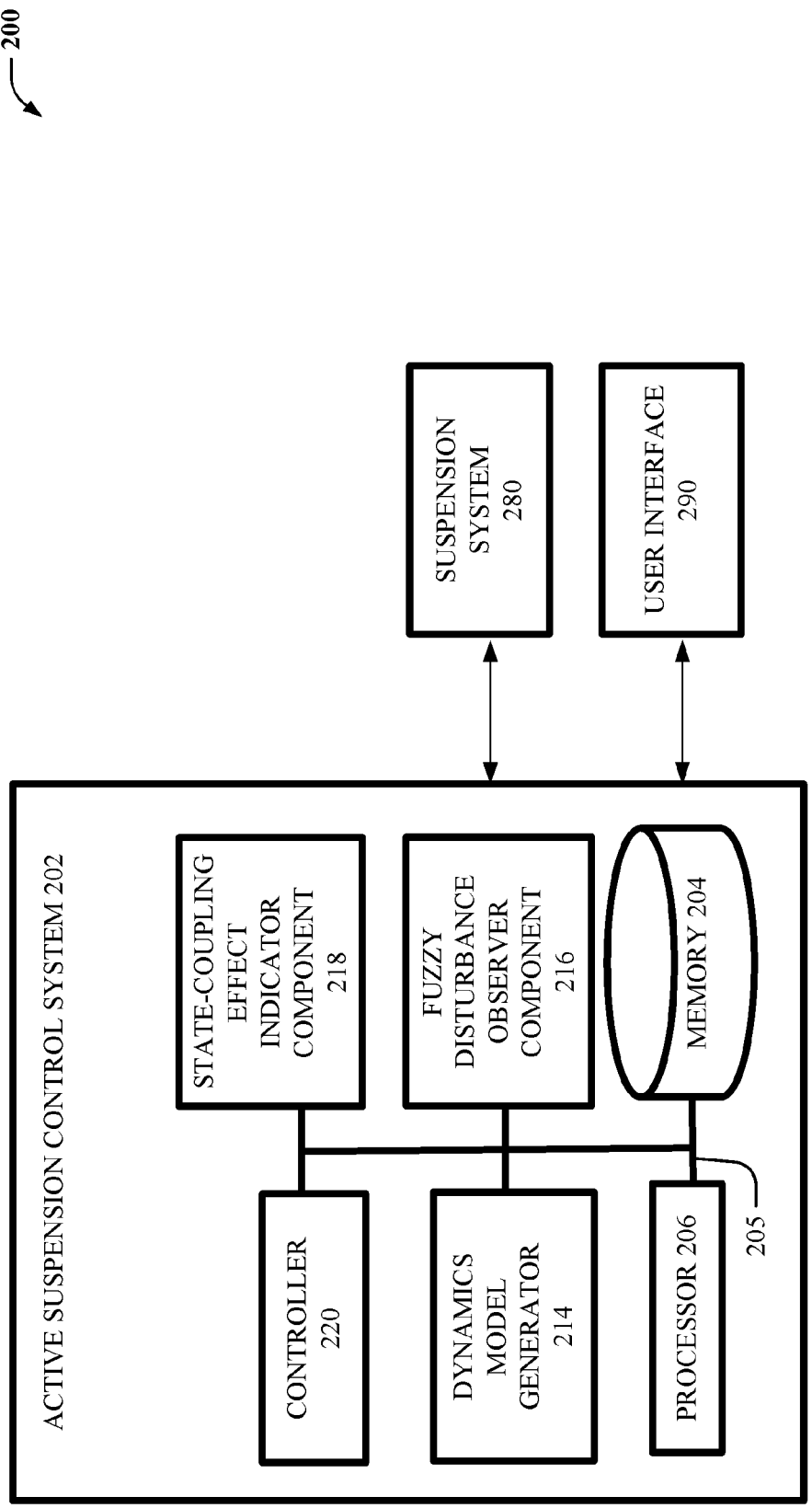
FIG. 2 illustrates another exemplary diagram of another active suspension control system, in accordance with one or more embodiments described herein.

Turning next to FIG. 2, a non-limiting system 200 is depicted. One or more embodiments of the non-limiting system 200 described herein can include one or more devices, systems and/or apparatuses that can enable a process to control a suspension system 280, such as an active suspension system 280, in accordance with one or more embodiments described herein. Repetitive description of like elements and/or processes employed in respective embodiments is omitted for the sake of brevity. While referring here to one or more processes, facilitations, and/or uses of the non-limiting system 200, description provided herein, both above and below, also can be relevant to one or more non-limiting systems or elements of other non-limiting systems described herein, such as the non-limiting system 100.

The non-limiting system 200 can comprise an active suspension control system 202 that can enable both a process to eliminate undesirable variables such as disturbances, nonlinearities and/or state-coupling effects, while also employing a process to use and maintain one or more positive disturbances, nonlinearities and/or state-coupling effect.

The active suspension control system 202, as illustrated, can comprise any suitable type of component, machine, device, facility, apparatus, and/or instrument that comprises a processor and/or can be capable of effective and/or operative communication with a wired and/or wireless network. All such embodiments are envisioned. For example, the active suspension control system 202 can comprise a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device. Likewise, the active suspension control system 202 can be disposed and/or run at any suitable device, such as, but not limited to a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device.

The active suspension control system 202 can be associated with, such as accessible via, a cloud computing environment. For example, the active suspension control system 202 can be associated with a cloud computing environment 1202 described below with reference to illustration 1200 of FIG. 12.

Operation of the non-limiting system 200 and/or of the active suspension control system 202 is not limited to observance, elimination and/or use of a single variable, such as a single nonlinearity, disturbance and/or state-coupling term. Rather, operation of the non-limiting system 200 and/or of the active suspension control system 202 can be scalable. For example, the non-limiting system 200 and/or the active suspension control system 202 can enable plural variable control processes at least partially in parallel with one another.

In one or more embodiments, a vehicle and/or the suspension system 280 can comprise the active suspension control system 202, such as illustrated at FIG. 2. In one or more other embodiments, the active suspension control system 202 can be separate from the vehicle (or other movable element) and/or suspension system 280 but can obtain data from one or more sensors at the vehicle and/or suspension system 280.

As illustrated the active suspension control system 202 can comprise a processor 206, memory 204, bus 205, dynamics model generator 214, fuzzy disturbance observer component 216, state-coupling effect indicator component 218 and/or controller 220.

One or more communications between one or more components of the non-limiting system 200 and/or the active suspension control system 202 can be provided by wired and/or wireless means including, but not limited to, employing a cellular network, a wide area network (WAN) (e.g., the Internet), and/or a local area network (LAN). Suitable wired or wireless technologies for providing the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol, and/or other proprietary and/or non-proprietary communication protocols.

Discussion now turns to the processor 206, memory 204, and bus 205 of the active suspension control system 202.

For example, in one or more embodiments, the active suspension control system 202 can comprise a processor 206 (e.g., computer processing unit, microprocessor, classical processor, and/or like processor). In one or more embodiments, a component associated with the active suspension control system 202, as described herein with or without reference to the one or more figures of the one or more embodiments, can comprise one or more computer and/or machine readable, writable, and/or executable components and/or instructions that can be executed by processor 206 to provide performance of one or more processes defined by such component(s) and/or instruction(s). In one or more embodiments, the processor 206 can comprise the dynamics model generator 214, fuzzy disturbance observer component 216, state-coupling effect indicator component 218 and/or controller 220.

In one or more embodiments, the active suspension control system 202 can comprise a computer-readable memory 204 that can be operably connected to the processor 206. The memory 204 can store computer-executable instructions that, upon execution by the processor 206, can cause the processor 206 and/or one or more other components of the active suspension control system 202 (e.g., the dynamics model generator 214, fuzzy disturbance observer component 216, state-coupling effect indicator component 218 and/or controller 220) to perform one or more actions. In one or more embodiments, the memory 204 can store computer-executable components (e.g., the dynamics model generator 214, fuzzy disturbance observer component 216, state-coupling effect indicator component 218 and/or controller 220).

The active suspension control system 202 and/or a component thereof as described herein, can be communicatively, electrically, operatively, optically, and/or otherwise coupled to one another via a bus 205 to perform functions of non-limiting system 200, active suspension control system 202 and/or one or more components thereof and/or coupled therewith. Bus 205 can comprise one or more of a memory bus, memory controller, peripheral bus, external bus, local bus, and/or another type of bus that can employ one or more bus architectures. One or more of these examples of bus 205 can be employed to implement one or more embodiments described herein.

In one or more embodiments, the active suspension control system 202 can be coupled (e.g., communicatively, electrically, operatively, optically, and/or like function) to one or more external systems (e.g., a non-illustrated electrical output production system, one or more output targets, an output target controller, and/or the like), sources and/or devices (e.g., computing devices, communication devices, and/or like devices), such as via a network. In one or more embodiments, one or more of the components of the active suspension control system 202 can reside in the cloud, and/or can reside locally in a local computing environment (e.g., at a specified location(s)).

It is noted that in one or more embodiments, the controller 220 can be disposed separate from, but communicable with, the active suspension control system 202.

In addition to the processor 206 and/or memory 204 described above, active suspension control system 202 can comprise one or more computer and/or machine readable, writable, and/or executable components and/or instructions that, when executed by processor 206, can provide performance of one or more operations defined by such component(s) and/or instruction(s).

Turning now first to the dynamics model generator 214, this component can generally employ nonlinear dynamics for nonlinearly suppressing vibration of an active suspension system 280 and to generate an ideal output tracking trajectory of the active suspension system 280.

That is, the dynamics model generator 214 can be employed to generate a bioinspired dynamics model and determine nonlinear dynamics for nonlinear suppression of vibration of an active suspension system 280. The dynamics model generator 214 can output nonlinear stiffness and damping properties for application by the controller 220 to use for the nonlinear suppression of the vibration of the active suspension system. The dynamics model generator 214 can employ the bioinspired dynamics model by maintaining displacement of sprung and unsprung masses of the active suspension system within defined thresholds.

The fuzzy disturbance observer component 216 can generally determine a lumped disturbance to the active suspension system 280 by employing fuzzy variables absent determination of exact physical parameters of the active suspension system 280. The physical parameters can comprise, but are not limited to, one or more sprung and unsprung masses, stiffness coefficients and damping coefficients. The lumped disturbance can be determined based on a positive control gain and a calculated disturbance observation error, and by applying a reconstruction error to an estimated lumped disturbance determined by the fuzzy disturbance observer component.

The state-coupling effect indicator component 218 can generally analyze a state-coupling effect of the active suspension system by relating amplitude and directionality of disturbances to the active suspension system to a tracking control cooperating with the active suspension system. The state-coupling term can be determined at least partially based on whether a resultant state-coupling effect of the active suspension system can be employed to steer a mathematical function, such as a Lyapunov function, to move to a respective origin.

The controller 220 can generally apply respective outputs of the dynamics model generator 214 and the fuzzy disturbance observer component 216, in combination with a non-cancelled state-coupling term, to control the active suspension system 280 to thereby cause the nonlinear suppression of the vibration of the active suspension system 280. The output of the dynamics model generator 214 can be applied as an ideal output tracking trajectory of the active suspension system 280 by the controller 220, wherein this application can avoid elimination of at least one nonlinearity of the active suspension system 280.

In one or more embodiments, a feedback loop system can be employed, such as where the controller 220 can control the active suspension system 280 based on user input received via a user interface 290 in response to a suppression of vibration of the active suspension system 280.

To provide further information, as well as visuals, discussion turns to FIGS. 3 to 8.

Figure 3:
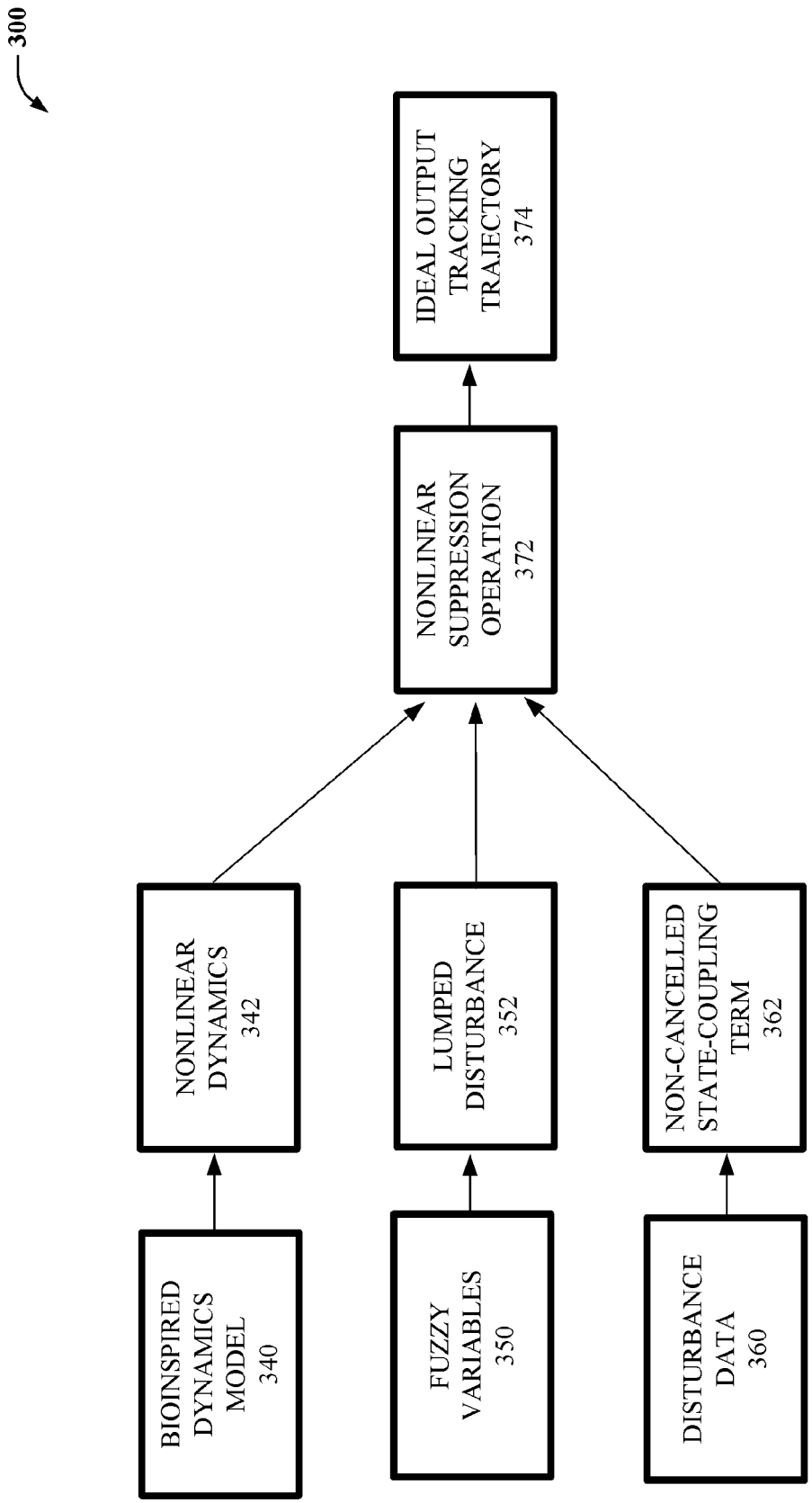
FIG. 3 illustrates a schematic of one or more processes and/or functions of the active suspension control system of FIG. 2, in accordance with one or more embodiments described herein.

Turning now to FIG. 3, illustrated is a schematic 300 relating the numerous components and functions of the active suspension system 200 to one another.

General Approach

Figure 7:
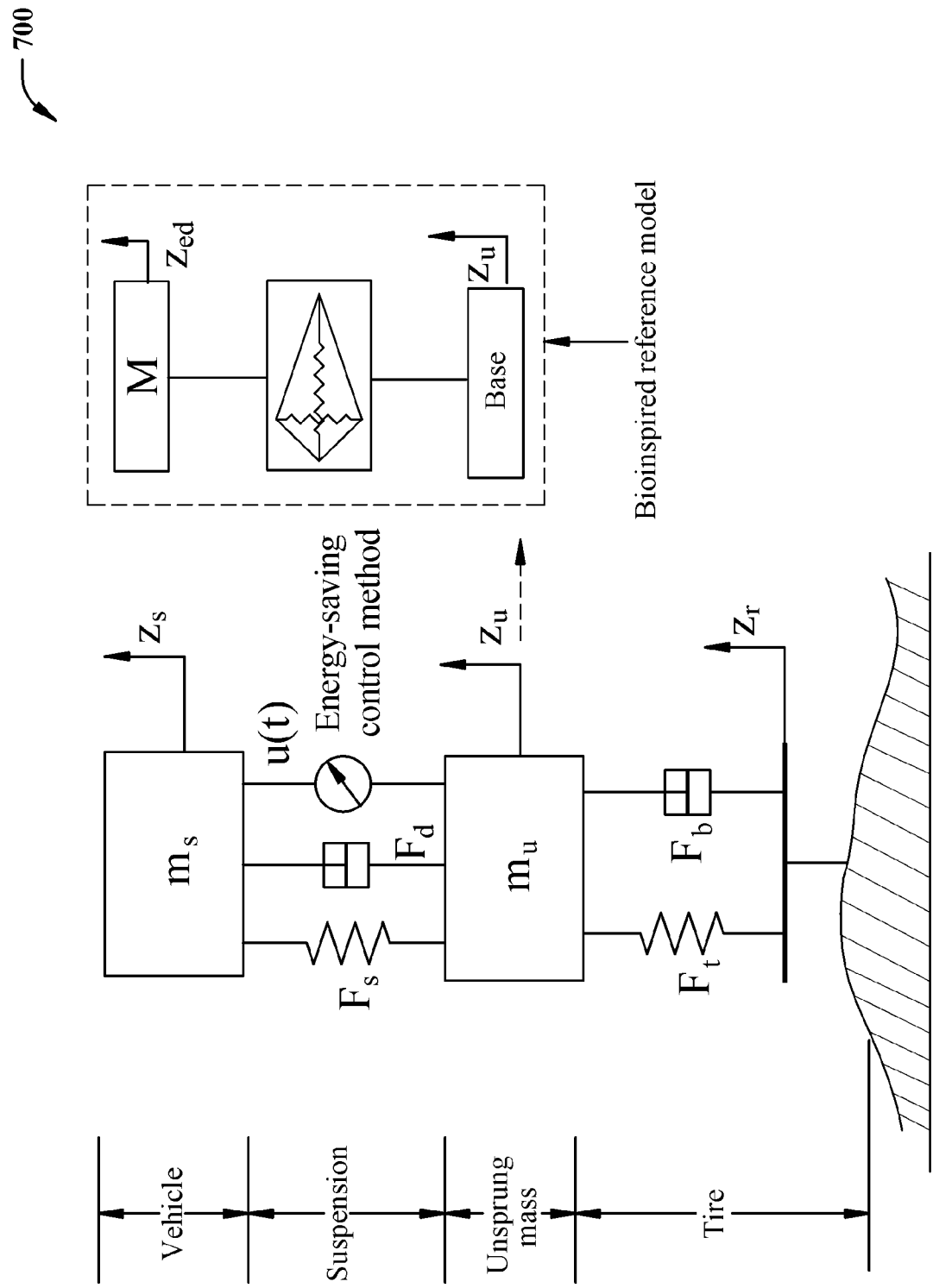
FIG. 7 illustrates a schematic of general nonlinear dynamics that can be employed by the active suspension control system of FIG. 2, in accordance with one or more embodiments described herein.

Generally, a dynamical equation for active suspensions, as illustrated at FIG. 7, can be described by:

$$m_s \ddot{z}_s = -F_s - F_d + d_1 + u(t); \text{ and} \qquad \text{Eq. 1:}$$

$$m_u \ddot{z}_u = F_s + F_d - F_t - F_b + d_2 - u(t), \qquad \text{Eq. 2:}$$

where $m_s$ and $m_u$ stand for the masses of the sprung and the unsprung, separately, $z_s$, $z_u$, as well as $z_r$ refer to the displacements of the sprung mass, the unsprung mass, as well as the road input, separately, $d_1$ and $d_2$ denote the disturbances produced by unmodeled dynamics, external disturbances and other factors, u(t) stands for the control input signal, $F_s$ and $F_d$ refer to the spring and the damper forces, respectively, $F_t$ and $F_b$ refer to the tire elasticity as well as damping forces. $F_s$, $F_d$, $F_t$, and $F_b$ are described by Eq. 1, $$F_s = k_{s1}(z_s - z_u) + k_{s2}(z_s - z_u)^3, \qquad \text{Eq. 3:}$$

$$F_d = k_d(\dot{z}_s - \dot{z}_u), \qquad \text{Eq. 4:}$$

$$F_t = k_t(z_u - z_r), \text{ and} \qquad \text{Eq. 5:}$$

$$F_b = k_b(\dot{z}_u - \dot{z}_r), \qquad \text{Eq. 6:}$$

with $k_{s1}$ as well as $k_{s2}$ referring to stiffness parameters, $k_d$ representing the damping coefficient, $k_t$ as well as $k_b$ denoting tire stiffness and damping parameters, separately, which can have the following forms:

$$k_{si} = \bar{k}_{si}(1 + \Delta_{si}), i=1,2, \qquad \text{Eq. 7:}$$

$$k_d = \bar{k}_d(1 + \Delta_d), \qquad \text{Eq. 8:}$$

$$k_t = \bar{k}_t(1 + \Delta_t), \text{ and} \qquad \text{Eq. 9:}$$

$$k_b = \bar{k}_b(1 + \Delta_b), \qquad \text{Eq. 10:}$$

where $z_t = z_u - z_r$ denotes the tire travel, $\tilde{m}_s$ and $\tilde{m}_u$ stands for nominal value of the sprung as well as the unsprung masses, D represents following unknown disturbance:

$$D = -\bar{k}_{s1}\Delta_{s1}z_e - \bar{k}_{s2}\Delta_{s2}z_e^3 - \bar{k}_d\Delta_d\dot{z}_e + \frac{m_u}{m_s + m_u}d_1 - \qquad \text{Eq. 12}$$
$$\frac{m_s}{m_s + m_u}d_2 + \left(\frac{m_s}{m_s + m_u} - \frac{\bar{m}_s}{\bar{m}_s + \bar{m}_u}\right)(\bar{k}_t\Delta_t z_t + \bar{k}_b\Delta_b\dot{z}_t).$$

From Eq. 2, it can be derived that $$m_u\ddot{z}_t = k_{s1}z_e + k_{s2}z_e^3 + k_d\dot{z}_e - \bar{k}_t z_t - \bar{k}_b\dot{z}_t - m_u\ddot{z}_r + d_2 - u(t). \qquad \text{Eq. 13:}$$

To promote the following control scheme construction, suspension space tracking error can be introduced as $$e = z_e - z_{ed}. \qquad \text{Eq. 14:}$$

Substituting Eq. 14 into Eq. 11, it can be derived that $$\bar{m}\ddot{e} = -\bar{k}_{s1}e - \bar{k}_{s2}e^e - \bar{k}_d\dot{e} + \frac{\bar{m}_s}{\bar{m}_s + \bar{m}_u}(\bar{k}_t z_t + \bar{k}_b\dot{z}_t) - \qquad \text{Eq. 15}$$
$$\bar{k}_{s1}z_{ed} - \bar{k}_{s2}z_{ed}^3 - \bar{k}_d\dot{z}_{ed} - \bar{m}\ddot{z}_{ed} + \Lambda + u(t),$$

where $$\bar{m} = \frac{\bar{m}_s\bar{m}_u}{\bar{m}_s + \bar{m}_u}$$

denotes auxiliary function, $\Lambda$ represents the following lumped disturbance:

$$\Lambda = \left(\frac{\bar{m}_s\bar{m}_u}{\bar{m}_s + \bar{m}_u} - \frac{m_s m_u}{m_s + m_u}\right)\ddot{z}_{ed} + \left(\frac{m_s m_u}{m_s + m_u} - \frac{\bar{m}_s\bar{m}_u}{\bar{m}_s + \bar{m}_u}\right)\ddot{e} + D. \qquad \text{Eq. 16}$$

It can follow from Eqs. 13 and 14 that $$m_u\ddot{z}_t = k_{s1}e + k_{s2}e^3 + k_d\dot{e} - \bar{k}_t z_t - \bar{k}_b\dot{z}_t - m_u\ddot{z}_r + k_{s1}z_{ed} + k_{s2}z_{ed}^3 + k_d\dot{z}_{ed} + d_2 - u(t). \qquad \text{Eq. 17:}$$

In the defined error dynamics of Eqs. 15 and 17, $$\frac{\bar{m}_s}{\bar{m}_s + \bar{m}_u}(\bar{k}_t z_t + \bar{k}_b\dot{z}_t)$$

stands for the state-coupling effect resulting from the tire travel acceleration system at Eq. 17.

Problem Formulation

In view of the above, a control goal of one or more embodiments described herein can be to provide a robust tracking controller considering both state-coupling and disturbance effects to drive the suspension state $z_e = z_s - z_u$ precisely to the desired trajectory $z_{ed}$, in the sense that $$P = \begin{cases} u\dot{z}_e, & \text{If } u\dot{z}_e > 0 \\ 0, & \text{else} \end{cases}. \qquad \text{Eq. 21}$$

The designed robust tracking control method described herein can have less power consumption compared with other existing control methods under better ride comfort condition. In order to evaluate the control performance to a better extent, the following two indexes: root mean square value of the body acceleration as well as the actuator energy costs can be introduced:

$$\lim_{t\to\infty} z_e = z_{ed}. \qquad \text{Eq. 18}$$

where T denotes the experimental time, P is defined as $$\text{RMS}_{\ddot{z}_s} = \sqrt{\frac{1}{T}\int_0^T \ddot{z}_s^2 dt}, \text{ and} \qquad \text{Eq. 19}$$

$$\text{RMS}_P = \sqrt{\frac{1}{T}\int_0^T P^2 dt}, \qquad \text{Eq. 20}$$

Embodiment Description

As a result of the above, schematic 490 of FIG. 4 can provide beneficial nonlinear dynamics for active suspensions, a fuzzy disturbance observer to estimate the known/uncertain disturbance accurately, indicators for state-coupling and disturbance effects to judge the pros and cons of the state-coupling and disturbance effects, and an energy-saving controller.

Bioinspired Nonlinear Dynamics

For example, a bioinspired dynamics model 340 can be employed to determine the nonlinear dynamics 342. Turning briefly to FIG. 4 and schematic 400, variables such as maintained displacement of masses 452 and additional data 454 can be fed to the bioinspired dynamics model 340. Outputs of the nonlinear dynamics 342 can comprise nonlinear stiffness properties 482 and nonlinear damping properties 484.

Schematic 490 briefly illustrates a structure consisting of springs, joints, and rods. This multilayer structure is bioinspired. The X-shaped structure can be capable of suppressing vibration in a beneficial nonlinear way, including its nonlinear stiffness and damping properties. Schematic 490 part (b) illustrates the reference model.

$z_{ed}$ can be calculated by the following equation:

$$M\ddot{z}_{ed} + b_1 + \frac{s_v}{n^2}z_{ed} + \mu_1\dot{z}_{ed} + \mu_2 n_x b_2 \dot{z}_{ed} = -M\ddot{z}_u, \quad \text{Eq. 22}$$

wherein $s_v$ refers to the spring stiffness in vertical direction, $n_x=3n+1$ stands for joints' number, $\mu_1$ as well as $\mu_2$ denotes the air resistance coefficient and the friction-related coefficient, respectively, $b_1$ and $b_2$ refer to the following two auxiliary functions:

$$b_1 = \frac{s_H E}{2n}\left(l_1 \cos\theta_1 - \sqrt{l_1^2 - E^2} + l_2 \cos\theta_2 - \sqrt{l_2^2 - E^2}\right) \times \quad \text{Eq. 23}$$
$$\left(\frac{1}{\sqrt{l_1^2 - E^2}} + \frac{1}{\sqrt{l_2^2 - E^2}}\right); \text{ and}$$

$$b_2 = \left(\frac{l_1}{2n\sqrt{l_1^2 - E^2}} + \frac{l_2}{\sqrt{l_2^2 - E^2}}\right)^2,$$

with $s_h$ standing for the spring stiffness in horizontal direction, and E referring to the auxiliary function as follows:

$$E = l_1 \sin\theta_1 + \frac{z_{ed}}{2n} = l_2 \sin\theta_2 + \frac{z_{ed}}{2n}. \quad \text{Eq. 24}$$

To ensure that $z_{ed}$, $\dot{z}_{ed}$, and $\ddot{z}_{ed}$ are always kept within permitted ranges, (22) is revised by $$\begin{cases} z_{ed} = \lambda_1, & z_{ed} < \lambda_1 \\ M\ddot{z}_{ed} + b_1 + \frac{s_v}{n^2}z_{ed} + \mu_1\dot{z}_{ed} + \mu_2 n_x b_2 \dot{z}_{ed} = -M\ddot{z}_u, & \lambda_1 \leq z_{ed} \leq \lambda_2, \\ z_{ed} = \lambda_2, & z_{ed} > \lambda_2 \end{cases} \quad \text{Eq. 25}$$

$$\begin{cases} \dot{z}_{ed} = \delta_1, & \dot{z}_{ed} < \delta_1 \\ M\ddot{z}_{ed} + b_1 + \frac{s_v}{n^2}z_{ed} + \mu_1\dot{z}_{ed} + \mu_2 n_x b_2 \dot{z}_{ed} = -M\ddot{z}_u, & \delta_1 \leq \dot{z}_{ed} \leq \delta_2, \text{ and} \\ \dot{z}_{ed} = \delta_2, & \dot{z}_{ed} > \delta_2 \end{cases} \quad \text{Eq. 26}$$

$$\begin{cases} \ddot{z}_{ed} = \beta_1, & \ddot{z}_{ed} < \beta_1 \\ M\ddot{z}_{ed} + b_1 + \frac{s_v}{n^2}z_{ed} + \mu_1\dot{z}_{ed} + \mu_2 n_x b_2 \dot{z}_{ed} = -M\ddot{z}_u, & \lambda\beta_1 \leq \ddot{z}_{ed} \leq \beta_2, \\ \ddot{z}_{ed} = \beta_2, & \ddot{z}_{ed} > \beta_2 \end{cases} \quad \text{Eq. 27}$$

wherein $\lambda_1$ and $\lambda_2$ stand for the minimum and the maximum of $z_{ed}$, respectively, $\delta_1$ as well as $\delta_2$ refer to the minimum and the maximum of $\dot{z}_{ed}$, respectively, $\beta_1$ and $\beta_2$ represent the minimum and the maximum of $\ddot{z}_{ed}$, respectively.

Fuzzy Disturbance Observer

Figure 5:
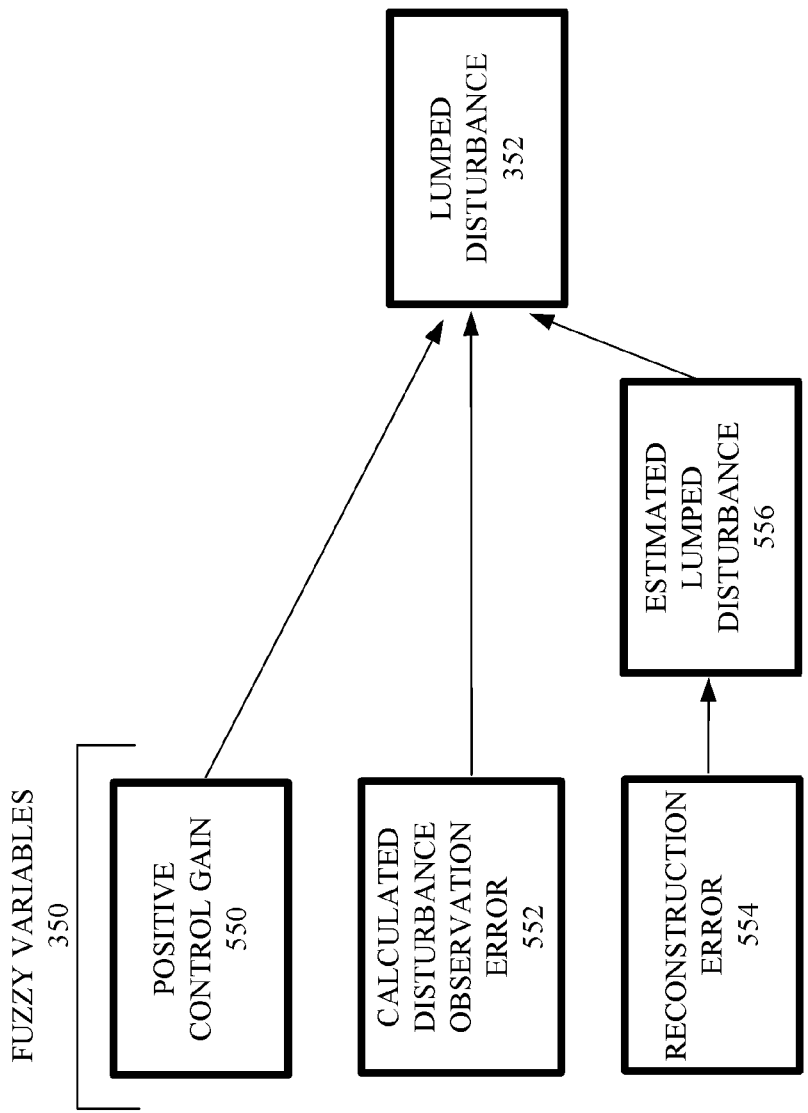
FIG. 5 illustrates a schematic of one or more fuzzy disturbance processes and/or functions of the active suspension control system of FIG. 2, in accordance with one or more embodiments described herein.

Returning to FIG. 3, fuzzy variables 350 can be employed to determine a lumped disturbance 352. Turning briefly to FIG. 5 and schematic 500, the fuzzy variables 350 can comprise positive control gain 550, calculated disturbance observation error 552 and reconstruction error 554. The reconstruction error 554 can be employed to determine an estimated lumped disturbance 556, which itself can be employed to determine the lumped disturbance 352 (e.g., by the fuzzy disturbance observer component 216).

The lumped disturbance A in Eq. 15 can be approximated by a fuzzy disturbance observer component 216:

$$\hat{\Lambda} = \hat{\phi}^T \xi(x), \quad \text{Eq. 28}$$

where $\hat{\Lambda}$ stands for the estimated value of $\Lambda$, $x=[e \; \dot{e}]^T \in \Re^2$ represents the fuzzy variable, $\hat{\phi} \in \Re^2$ refers to the adjustable parameter vector, $\xi^T=(\xi^1, \xi^2, \ldots, \xi^r)^T \in \Re^r$, with r denoting the number of fuzzy rules, $\xi^i$ standing for the fuzzy basis function, which can be represented by $$\xi^i = \frac{\prod_{j=1}^{2} \mu_{A_j^i}(x_j)}{\sum_{i=1}^{r}\left(\prod_{j=1}^{2} \mu_{A_j^i}(x_j)\right)}, \quad \text{Eq. 29}$$

where $\mu_{A_j^i}(x_j)$ refers to the membership function.

Next, the following observation dynamic system is considered:

$$\dot{\delta} = -\sigma\delta - \overline{k}_{si}e - \overline{k}_{s2}e^3 - \overline{k}_d\dot{e} + \frac{\overline{m}_s}{\overline{m}_s + \overline{m}_u}(\overline{k}_t z_t + \overline{k}_b \dot{z}_t) - \quad \text{Eq. 30}$$
$$\overline{k}_{s1}z_{ed} - \overline{k}_{s2}z_{ed}^3 - \overline{k}_d \dot{z}_{ed} - \overline{m}\ddot{z}_{ed} + \hat{\Lambda} + u(t) + \sigma\overline{m}\dot{e},$$

where $\sigma \in \Re^+$ refers to a positive control gain and define the disturbance observation error $\zeta$ as $$\zeta = \overline{m}\dot{e} - \delta. \quad \text{Eq. 31:}$$

From Eqs. 15, 30 and 31, it can be obtained that $$\dot{\zeta} + \sigma\zeta = \Lambda - \hat{\Lambda}. \quad \text{Eq. 32:}$$

The adjustable parameter vector is tuned by $$\dot{\hat{\phi}} = -\gamma\zeta\xi(x), \quad \text{Eq. 33:}$$

where $\gamma \in \Re^+$ is a positive control gain.

Then, the disturbance can be well monitored, the lumped disturbance $\Lambda$ is represented by $$\Lambda = \hat{\Lambda} + \varepsilon, \quad \text{Eq. 34:}$$

with $\varepsilon$ standing for a reconstruction error satisfying $|\varepsilon| \leq \overline{\varepsilon}$, with $\overline{\varepsilon}$ being upper bound. In addition, $\varepsilon$ will be reduced together with the increase of the number of fuzzy rules.

Influence Indicators of State-Coupling and Disturbance

Figure 6:
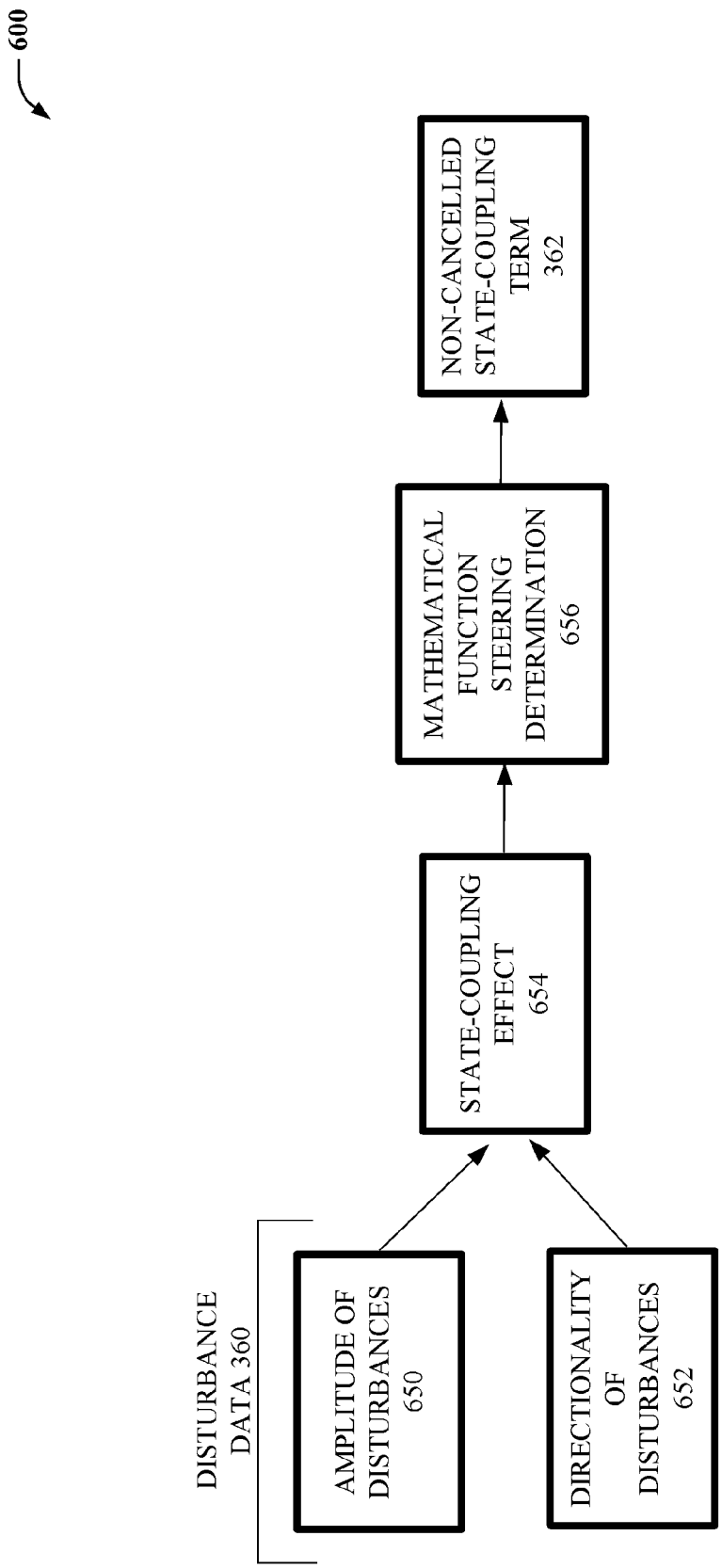
FIG. 6 illustrates a schematic of one or more state-coupling processes and/or functions of the active suspension control system of FIG. 2, in accordance with one or more embodiments described herein.

Returning to FIG. 3, disturbance data 360 can be employed to determine a non-cancelled state-coupling term 362 (e.g., by the state-coupling effect indicator component 218). Turning briefly to FIG. 6 and schematic 600, the disturbance data 360 can comprise amplitude of disturbances 650 and directionality of disturbances 652. This disturbance data 360 can be employed to determine a state-coupling effect 654, which in turn can be fed to a mathematical function steering determination 656 (e.g., employing a Lyapunov function) to determine the non-cancelled state-coupling term 362.

Because of its highly nonlinear characteristic, the state-coupling term can be regarded as a known part by assuming that the states are measurable, and thus directly canceled out. However, state-couplings can have impacts on stability and entire control performance of a controlled system subject to disturbance and measurement noise.

For example, the amplitude and directionality of disturbances potentially present at least two desired influences on an active suspension system. The disturbance amplitude is closely related to the stability of the system, and can be well addressed in the system framework described herein with a boundedness analysis. The disturbance directionality, which is rarely studied, could be related to how the tracking performance is influenced by disturbances. For example, those unavoidable time-varying disturbances can be used to provide a direction of the control effort. If the sign of the time-varying disturbances is compatible with the desired motion, the time-varying disturbances might be able to enhance the tracking performance. Hence, the relation of disturbance effect to tracking performance is worthy of analysis.

To make use of beneficial state-couplings and disturbances, the definitions of two indicators for state-coupling and disturbance effects are proposed and defined in the following.

Definition 1: For the error model Eqs. 15 and 17, the state-coupling effect indicator is constructed as follows:

$$J_1 = \text{sgn}[(\dot{e}+2\alpha \arctan(e))(\overline{k}_t z_t + \overline{k}_b \dot{z}_t)]. \quad \text{Eq. 35}$$

Based on the introduced state-coupling effect indicator, the state-coupling effect on e system of Eq. 15 is introduced as $$\begin{cases} J_1 < 0, \text{ State-coupling effect is advantageous} \\ J_1 > 0, \text{ State-coupling effect is disadvantageous} \\ J_1 = 0, \text{ State-coupling effect is nil} \end{cases} \quad \text{Eq. 36}$$

Definition 2: Consider the e system of Eq. 15, the disturbance effect indicator is represented by $$J_2 = \text{sgn}[e\hat{\Lambda}], \quad \text{Eq. 37}$$

and then the disturbance effect on e system (15) is constructed as $$\begin{cases} J_2 < 0, \text{ Disturbance effect is beneficial} \\ J_2 > 0, \text{ Disturbance effect is detrimental} \\ J_2 = 0, \text{ Disturbance effect is nil} \end{cases} \quad \text{Eq. 38}$$

The role of the state-coupling effect indicator can be to present the effect of one sub-system on the other sub-system. Or more accurately, the potential benefit of the state-coupling effect can be determined by whether the state-coupling is helpful to steer a mathematical function, such as a Lyapunov function (or other similar energy functions or pre-defined indicators), to move to the origin. To better explain design of the state-coupling effect indicator as Eq. 35, the Lyapunov function can be selected as $$V = \frac{1}{2}\overline{m}\dot{e}^2 + \frac{1}{2}\overline{k}_{s1}e^2 + \frac{1}{4}\overline{k}_{s2}e^4 + \frac{2k_P}{\pi}\left[e \arctan(e) - \frac{1}{2}\ln(1+e^2)\right] + 2\alpha\overline{m}\dot{e}\arctan(e),$$

and one can directly obtain that $$\dot{V} = -k_1\dot{e}^2 + \frac{\overline{m}_s}{\overline{m}_s + \overline{m}_u}(\dot{e}+2\alpha \arctan(e))\underbrace{\left[(\overline{k}_t z_t + \overline{k}_b \dot{z}_t) - \Phi(\overline{k}_t z_t + \overline{k}_b \dot{z}_t)\right]}_{X((\overline{k}_t z_t + \overline{k}_b \dot{z}_t))}$$

by designing the control input u(t), where $k_1$ denotes a positive control gain, $\Phi(\overline{k}_t z_t + \overline{k}_b \dot{z}_t)$ stands for a function with respect to the state-coupling effect $\overline{k}_t z_t + \overline{k}_b \dot{z}_t$, which can be desired to be constructed. It is clearly seen that the sign of $\dot{V}$ is associated with $X(\overline{k}_t z_t + \overline{k}_b \dot{z}_t)$.

Next, the following cases can be taken into consideration.

Case 1: $J_1 < 0$.

On this occasion, $\Phi(\overline{k}_t z_t + \overline{k}_b \dot{z}_t)$ can be selected as 0. The state-coupling effect on the e system is helpful in the aspect of control, and hence it can be injected in the following controller development.

Case 2: $J_1 \geq 0$.

In this case, $\Phi(\overline{k}_t z_t + \overline{k}_b \dot{z}_t)$ can be chosen as $\Phi(\overline{k}_t \dot{z}_t + \overline{k}_b \dot{z}_t) = \overline{k}_t z_t + \overline{k}_b \dot{z}_t$, which leads to $X(\overline{k}_t z_t + \overline{k}_b \dot{z}_t) = 0$. The state-coupling effect is regarded as harmful/nil element, and thus it is eliminated.

In addition, Definition 2 can offer insight to identify the effect of the lumped disturbance on the error system. If the useful disturbance effect occurs, this effect should be fully utilized in the system, rather than being eliminated directly. As a consequence, it can be desired to involve the disturbance effect indicator into the outputs of the active suspension control system 202.

Robust Control Law Design and Stability Analysis

Discussion now turns to theorems and proofs for the active suspension control systems described herein.

Theorem 1: For the error-dynamics model in (15) and (17), if the fuzzy disturbance observer-based robust control method is designed as $$u(t) = \\ -\frac{2k_P}{\pi}\arctan(e) - \frac{2k_D}{\pi}\arctan(\dot{e}) - k_s \text{ sgn}(\dot{e}+2\alpha \arctan(e)) + \overline{k}_{s1}z_{ed} + \\ \overline{k}_{s2}z_{ed}^3 + \overline{k}_d \dot{z}_{ed} + \overline{m}\ddot{z}_{ed} - \frac{\overline{m}_s}{\overline{m}_s+\overline{m}_u}(\overline{k}_t z_t + \overline{k}_b \dot{z}_t)F(J_1) - \hat{\Lambda}F(J_2), \quad \text{Eq. 39}$$

where $k_P$, $k_D$, and $k_S$ stand for positive control gains, and the detailed expressions of $F(J_1)$ and $F(J_2)$ functions are defined as $$F(J_1) = \begin{cases} 1, & J_1 \geq 0 \\ 0, & J_1 < 0 \end{cases}, \text{ and} \quad \text{Eq. 40}$$

$$F(J_2) = \begin{cases} 1, & J_2 \geq 0 \\ 0, & J_2 < 0 \end{cases}. \quad \text{Eq. 41}$$

If the following conditions hold $$0 < \alpha < \frac{1}{2}, k_P > \alpha\overline{m} + \omega 0 < \omega(<< k)_P, 4\alpha\pi k_P - \alpha^2 \overline{k}_d - 2\alpha k_D \geq 0, \quad \text{Eq. 42}$$

$$k_D \geq \frac{\left(1+\sqrt{\frac{2V}{(1-2\alpha)\overline{m}}}\right)^2}{(2-\alpha)}\alpha\overline{m}\pi^2, k_S > 2\overline{\varepsilon} + \tau,$$

where $\alpha$ and $\omega$ represent auxiliary positive constants, the tracking error with its first-time derivative can achieve asymptotic tracking convergence even in the presence of parametric uncertainties as well as external disturbances, presenting that $$\lim_{t\to\infty} e = 0, \lim_{t\to\infty} \dot{e} = 0. \qquad \text{Eq. 43}$$

Proof: Firstly, the Lyapunov function candidate is introduced as follows:

$$V = \frac{1}{2}\overline{m}\dot{e}^2 + \frac{2k_P}{\pi}\left[e\,\arctan(e) - \frac{1}{2}\ln(1+e^2)\right] + \qquad \text{Eq. 44}$$

$$2\alpha\overline{m}\dot{e}\,\arctan(e) + \frac{1}{2}\overline{k}_{s1}e^2 + \frac{1}{4}\overline{k}_{s2}e^4.$$

To prove the constructed function in Eq. 44 is nonnegative, one can calculate the second term of the Lyapunov function candidate as $$\frac{2k_P}{\pi}\left[e\,\arctan(e) - \frac{1}{2}\ln(1+e^2)\right] = \qquad \text{Eq. 45}$$

$$\frac{2(k_P - \omega) + 2\omega}{\pi}\left[e\,\arctan(e) - \frac{1}{2}\ln(1+e^2)\right] \geq$$

$$\frac{k_P - \omega}{\pi}\arctan^2(e) + \frac{2\omega}{\pi}\left[e\,\arctan(e) - \frac{1}{2}\ln(1+e^2)\right],$$

where the property $2[e\,\arctan(e) - \frac{1}{2}\ln(1+e^2)] \geq \arctan^2(e)$ is used for the arrangement. Additionally, by using the Young's inequality, the third term of Eq. 44 could be arranged in the following:

$$2\alpha\overline{m}\dot{e}\,\arctan(e) \geq -\alpha\overline{m}\dot{e}^2 - \alpha\overline{m}\arctan^2(e) \qquad \text{Eq. 46:}$$

Substituting (45) and (46) into (44), one can be led to the following result:

$$= \frac{1}{2}\overline{m}\dot{e}^2 + \frac{2k_P}{\pi}\left[e\,\arctan(e) - \frac{1}{2}\ln(1+e^2)\right] + 2\alpha\overline{m}\dot{e}\,\arctan(e) + \qquad \text{Eq. 47}$$

$$\frac{1}{2}\overline{k}_{s1}e^2 + \frac{1}{4}\overline{k}_{s2}e^4 = \left(\frac{1}{2} - \alpha\right)\overline{m}\dot{e}^2 + \left(\frac{k_P - \omega}{\pi} - \alpha\right)\overline{m}\arctan^2(e) +$$

$$\frac{2\omega}{\pi}\left[e\,\arctan(e) - \frac{1}{2}\ln(1+e^2)\right] + \frac{1}{2}\overline{k}_{s1}e^2 + \frac{1}{4}\overline{k}_{s2}e^4.$$

By employing the conditions in Eq. 42, one can know that the function in Eq. 44 is nonnegative.

Then, differentiating Eq. 44 in regard to time, and substituting Eqs. 15 and 39 into the resulting result, yields $$\dot{V} = \overline{m}\dot{e}\ddot{e} + \overline{k}_{s1}e\dot{e} + \overline{k}_{s2}e^3\dot{e} + \qquad \text{Eq. 48}$$

$$\frac{2k_P}{\pi}\dot{e}\,\arctan(e) + 2\alpha\overline{m}\ddot{e}\,\arctan(e) + 2\alpha\overline{m}\frac{\dot{e}^2}{1+e^2} =$$

$$-\overline{k}_d\dot{e}^2 - \frac{2k_D}{\pi}\dot{e}\,\arctan(\dot{e}) - 2\alpha\overline{k}_{s1}e\,\arctan(e) - 2\alpha\overline{k}_{s2}e^3\,\arctan(e) -$$

$$\frac{4\alpha k_P}{\pi}\arctan^2(e) - 2\alpha\overline{k}_d\dot{e}\,\arctan(e) - \frac{4\alpha k_D}{\pi}\arctan(e)\,\arctan(\dot{e}) +$$

$$2\alpha\overline{m}\frac{\dot{e}^2}{1+e^2} + \frac{\overline{m}_s}{\overline{m}_s + \overline{m}_u}(\dot{e} + 2\alpha\,\arctan(e))(\overline{k}_t z_t + \overline{k}_b \dot{z}_t)(1 - F(J_1)) +$$

$$(\dot{e} + 2\alpha\,\arctan(e))(\Lambda - \hat{\Lambda}F(J_2) - k_s\,\text{sgn}(\dot{e} + 2\alpha\,\arctan(e))).$$

Next, the signs of $(\dot{e}+2\alpha\,\arctan(e))(\overline{k}_t z_t+\overline{k}_b \dot{z}_t)(1-F(J_1))$ and $(\dot{e}+2\alpha\,\arctan(e))(\Lambda-\hat{\Lambda}F(J_2)-k_S\,\text{sgn}(\dot{e}+2\alpha\,\arctan(e)))$ are discussed. When $J_1<0$, which means the state-coupling effect is helpful, and based on the definitions of $J_1$ and $F(J_1)$, it is easy to conclude that $(\dot{e}+2\alpha\,\arctan(e))(\overline{k}_t z_t+\overline{k}_b \dot{z}_t)(1-F(J_1))<0$. When $J_1>0$, which means the state-coupling effect is harmful/nil, then $(\dot{e}+2\alpha\,\arctan(e))(\overline{k}_t z_t+\overline{k}_b \dot{z}_t)(1-F(J_1))=0$. To sum up, the relationship $$(\dot{e}+2\alpha\,\arctan(e))(\overline{k}_t z_t+\overline{k}_b \dot{z}_t)(1-F(J_1))\leq 0 \qquad \text{Eq. 49:}$$

can always hold.

The range of $\Lambda-\hat{\Lambda}F(J_2)=\Lambda-\hat{\Lambda}F(J_2)+\varepsilon$ is studied before discussing the sign of $(\dot{e}+2\alpha\,\arctan(e))\times(\Lambda-\hat{\Lambda}F(J_2)-k_S\,\text{sgn}(\dot{e}+2\alpha\,\arctan(e)))$. If $J_2<0$, which denotes that the disturbance effect is beneficial, one can derive that $|\Lambda-\Lambda F(J_2)|=|\Lambda+\varepsilon|\leq 2\overline{\varepsilon}+\tau$. If $J_2\geq 0$, which denotes the disturbance effect is detrimental/nil, one can have $|\Lambda-\Lambda F(J_2)|=|\varepsilon|\leq\overline{\varepsilon}$. In summary, the result of $|\Lambda-\Lambda F(J_2)|\leq 2\overline{\varepsilon}+\tau$ can be obtained. Then, it is easy to conclude that $$(\dot{e}+2\alpha\,\arctan(e))(\Lambda-\hat{\Lambda}F(J_2)-k_S\,\text{sgn}(\dot{e}+2\alpha\,\arctan(e)))= \qquad \text{Eq. 50:}$$
$$(\Lambda-\hat{\Lambda}F(J_2))(\dot{e}+2\alpha\,\arctan(e))-k_S|\dot{e}+2\alpha\,\arctan(e)|$$
$$\leq|\Lambda-\hat{\Lambda}F(J_2)||\dot{e}+2\alpha\,\arctan(e)|-k_S|\dot{e}+2\alpha\,\arctan(e)|$$
$$\leq(2\overline{\varepsilon}+\tau-k_S)|\dot{e}+2\alpha\,\arctan(e)|\leq 0.$$

Thereafter, according to the properties of $$\dot{e}\,\arctan(\dot{e}) \geq \frac{2}{\pi}\arctan^2(\dot{e}) \text{ and } \frac{1}{1+e^2} \leq 1,$$

the second and the eighth terms in (48) can be proceed as follows:

$$-\frac{2k_D}{\pi}\dot{e}\,\arctan(\dot{e}) \leq -\frac{4k_D}{\pi^2}\arctan^2(\dot{e}), \text{ and} \qquad \text{Eq. 51}$$

$$2\alpha\overline{m}\frac{\dot{e}^2}{1+e^2} \leq 2\alpha\overline{m}\dot{e}^2. \qquad \text{Eq. 52}$$

The sixth term in Eq. 48 is calculated as $$-2\alpha\overline{k}_d\dot{e}\,\arctan(e)\leq\overline{k}_d\dot{e}^2+\alpha^2\overline{k}_d\arctan^2(e). \qquad \text{Eq. 53:}$$

In a similar way, the seventh term in (48) can be deduced as $$-\frac{4\alpha k_D}{\pi}\arctan(e)\,\arctan(\dot{e}) \leq 2\alpha k_D\,\arctan^2(e) + \frac{2\alpha k_D}{\pi^2}\arctan^2(\dot{e}). \qquad \text{Eq. 54}$$

From the results in Eqs. 48-54 can be further written as $$\dot{V} \leq -\left(\frac{4-2\alpha}{\pi^2}\right)k_D\,\arctan^2(\dot{e}) + \qquad \text{Eq. 55}$$

$$2\alpha\overline{m}\dot{e}^2 - \left(\frac{4\alpha k_P}{\pi} - \alpha^2\overline{k}_d - \frac{2\alpha k_D}{\pi}\right)\arctan^2(e).$$

From the conditions in Eq. 42, it can be seen that, if the following inequality holds:

$$-\left(\frac{4-2\alpha}{\pi^2}\right)k_D \arctan^2(\dot{e}) + 2\alpha\overline{m}\dot{e}^2 \le 0, \qquad \text{Eq. 56}$$

$\dot{V} \le 0$ can be obtained.

To do so, the following two cases can be taken into consideration.

Case 1: $\dot{e}=0$. On this occasion, it is easy to conclude that the inequality in Eq. 56 is always valid.

Case 2: $\dot{e} \ne 0$. On this occasion, (56) can be simplified as $$\frac{\dot{e}^2}{\arctan^2(\dot{e})} \le \frac{(2-\alpha)k_D}{\alpha\overline{m}\pi^2}. \qquad \text{Eq. 57}$$

The following inequality always hold:

$$\frac{\dot{e}^2}{\arctan^2(\dot{e})} \le (1+|\dot{e}|)^2. \qquad \text{Eq. 58}$$

To guarantee (57) always hold, it suffices to select $k_D$ such that $$\frac{(2-\alpha)k_D}{\alpha\overline{m}\pi^2} \ge (1+|\dot{e}|)^2. \qquad \text{Eq. 59}$$

By employing the conditions in Eq. 42, it is not difficult to derive that $$V \ge \left(\frac{1}{2} - \alpha\right)\overline{m}\dot{e}^2. \qquad \text{Eq. 60}$$

which indicates that $$\dot{e}^2 \le \frac{2V}{(1-2\alpha)\overline{m}} \to |\dot{e}| \le \sqrt{\frac{2V}{(1-2\alpha)\overline{m}}}. \qquad \text{Eq. 61}$$

Substituting Eq. 61 into E1. 59, one can obtain that $$\frac{(2-\alpha)k_D}{\alpha\overline{m}\pi^2} \ge \left(1 + \sqrt{\frac{2V}{(1-2\alpha)\overline{m}}}\right)^2 \to$$

$$k_D \ge \frac{\left(1 + \sqrt{\frac{2V}{(1-2\alpha)\overline{m}}}\right)^2}{(2-\alpha)}\alpha\overline{m}\pi^2. \qquad \text{Eq. 62}$$

In view of the aforementioned analysis, if Eq. 62 holds, V(t) is calculated as follows:

$$\dot{V} \le -\eta_1 \arctan^2(e) - \eta_2 \arctan^2(\dot{e}) \le 0, \qquad \text{Eq. 63:}$$

where $\eta_1$ and $\eta_2$ stand for two positive constants, implying that the controlled system is Lyapunov stable, and the following conclusions can be directly obtained:

$$V \in L_\infty \to e, \dot{e} \in L_\infty \to u(t) \in L_\infty, \text{ and} \qquad \text{Eq. 64}$$

$$\lim_{t \to \infty} e = 0, \lim_{t \to \infty} \dot{e} = 0. \qquad \text{Eq. 65}$$

As a consequence, Theorem 1 can be proved.

Lyapunov Function Candidate

A brief discussion is now provided about how the Lyapunov function candidate is constructed in this proof above, by comparing with traditional Lyapunov function candidates. For the error system of Eq. 15, the traditional Lyapunov function candidate can be constructed as $$V = \frac{1}{2}\overline{m}\dot{e}^2 + \frac{2k_P}{\pi}\left[e\arctan(e) - \frac{1}{2}\ln(1+e^2)\right] + \frac{1}{2}\overline{k}_{s1}e^2 + \frac{1}{4}\overline{k}_{s2}e^4. \qquad \text{Eq. 66}$$

As a consequence, the traditional control scheme can be proposed as $$u(t) = -\frac{2k_P}{\pi}\arctan(e) - \frac{2k_D}{\pi}\arctan(\dot{e}) + \overline{k}_{s1}z_{ed} + \overline{k}_{s2}z_{ed}^3 + \overline{k}_d \dot{z}_{ed} + \overline{m}\ddot{z}_{ed} - \frac{\overline{m}_s}{\overline{m}_s + \overline{m}_u}(\overline{k}_t z_t + \overline{k}_b \dot{z}_t)F(J_1) - \hat{\Lambda}F(J_2). \qquad \text{Eq. 67}$$

Differentiating Eq. 66 with respect to time, and substituting Eq. 67 into the resulting equation, which is calculated as, $$\dot{V} \le -\frac{2k_D}{\pi}\dot{e}\arctan(\dot{e}) \le 0, \qquad \text{Eq. 68}$$

from which $$\lim_{t \to \infty} \dot{e} = 0$$

can be obtained. In addition, Eq. 15 can be deduced as $$\underbrace{\overline{m}\ddot{e} = \left\{ \begin{array}{c} -\overline{k}_{s1}e - \overline{k}_{s2}e^3 - \dfrac{2k_P}{\pi}\arctan(e) + (\Lambda - \hat{\Lambda}F(J_2)) + \\ \dfrac{\overline{m}_s}{\overline{m}_s + \overline{m}_u}(\overline{k}_t z_t + \overline{k}_b \dot{z}_t)(1 - F(J_1)) \end{array} \right\}}_{\Phi_1} \underbrace{-\overline{k}_d \dot{e} - \dfrac{2k_D}{\pi}\arctan(\dot{e})}_{\Phi_2},$$ Eq. 69 with $$\Phi_1 \in L_\infty, \lim_{t \to \infty} \Phi_2 = 0.$$

By employing extended Barbalat's lemma, it can be obtained that $$\lim_{t \to \infty} \ddot{e} = 0, \lim_{t \to \infty} \Phi_1 = 0.$$

However, from $$\lim_{t \to \infty} \Phi_1 = 0,$$

the error $$\lim_{t \to \infty} e = 0$$

cannot be guaranteed since one cannot ensure that $$\lim_{t \to \infty} (\Lambda - \hat{\Lambda}F(J_2)) + \frac{\overline{m}_s}{\overline{m}_s + \overline{m}_u}(\overline{k}_t z_t + \overline{k}_b \dot{z}_t)(1 - F(J_1)) = 0.$$

Active Suspension Control System Summary

Figure 8:
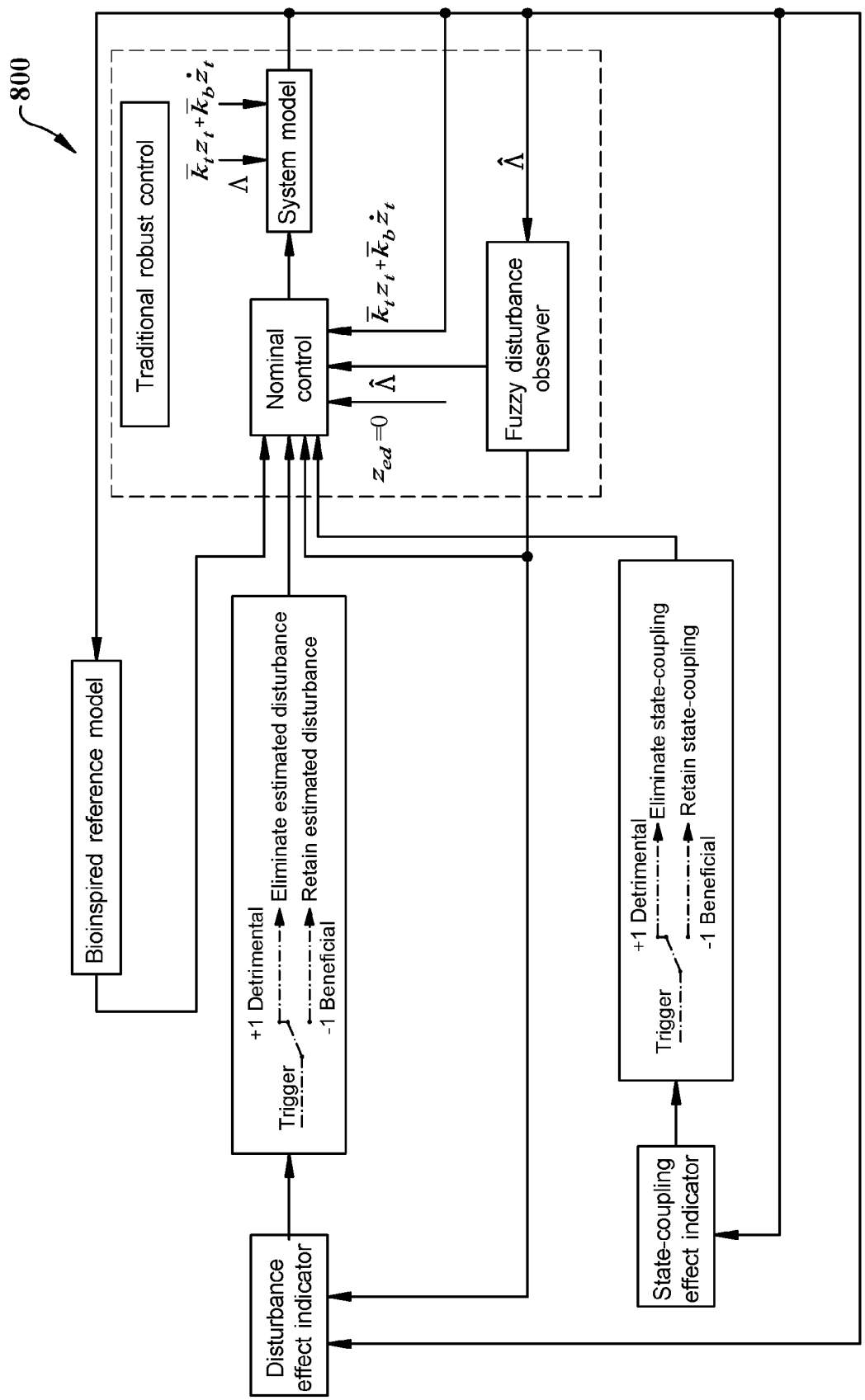
FIG. 8 illustrates a summary schematic of one or more processes and/or functions of the active suspension control system of FIG. 2, in accordance with one or more embodiments described herein.

To illustrate the spirit the control framework(s) described herein, the schematic diagram 800 is provided and shown in FIG. 8. As illustrated in FIG. 8, different from setting the reference trajectory as 0 in the standard active suspension control, the proposed control method can select the bioinspired nonlinear dynamics as the ideal output tracking trajectory, avoiding elimination of beneficial nonlinearities of the active suspension system, therefore, has the remarkable role with effect of energy conservation. Moreover, it can also be seen that the traditional robust control method deletes and compensates the disturbance and state-coupling directly. Differently, the control method described herein makes full use of the beneficial disturbance and state-coupling effects on active suspensions. For example, the one or more embodiments described herein can use the fuzzy disturbance observer to design the disturbance and state-coupling effect indicators, and then judges the cons and pros of the disturbance and state-coupling effects on active suspensions. The beneficial disturbance as well as state-coupling can be retained, while the detrimental ones can be eliminated by the introduced binary trigger conditions.

It is noted that additional nonlinear factors can exist relative to an active suspension system, such as including nonlinearity of elastic elements (air spring, typical nonlinearity), deformation factors of guiding bar system (e.g. rubber bushing), and/or asymmetry and hysteresis of damping element. For instance, when a moving vehicle encounters a pit or bulge, it can be expected that large damping makes the wheels cross the pit fast while when encountering bulge, and/or it can be expected that suspension performs smoothly, making the wheels skillfully cross the obstacle. Nonlinearity (typical asymmetry) of damping element can depend on empirical design or the driver's subjective evaluation. The asymmetry of damping element is so apparent that in compression, it can be only one-third of that in tension. Focusing on the above nonlinear factors, the disposing way of existing control methods is to eliminate it directly with its ideal state concerning linear model changing or without changing from time to time. However, the ideal state of control method described herein can employ the dynamic model of bionic bird leg. Different from the existing control methods, the one or more embodiments described herein can modify the existing nonlinear factors to the expected ones, avoiding the problem of eliminating beneficial nonlinear factors in vehicle suspension system, allowing for improvement of riding comfort with less energy consumption.

Example Method of Use

Figure 9:
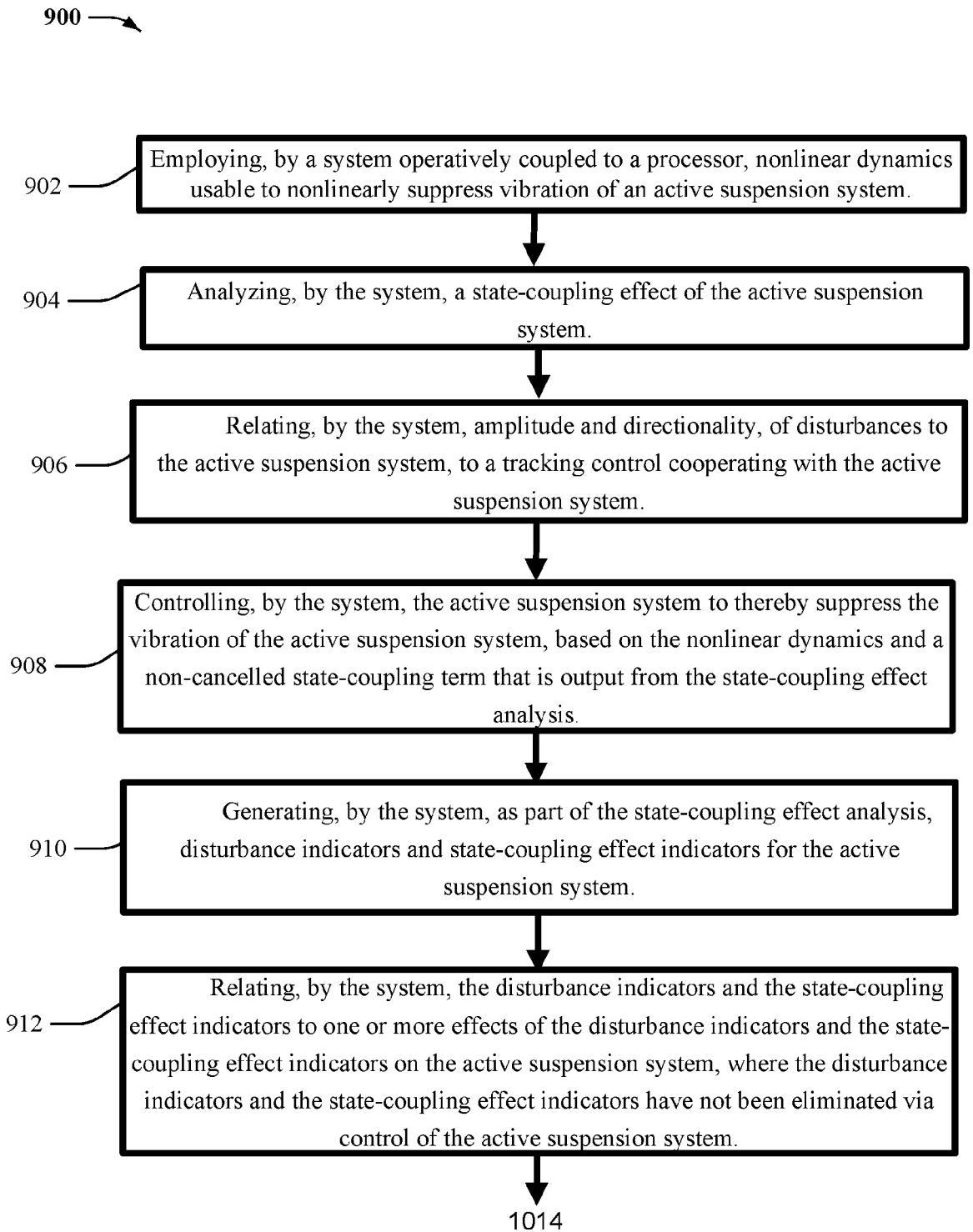
FIG. 9 illustrates a process flow of a method of use of the active suspension control system of FIG. 2, in accordance with one or more embodiments described herein.
Figure 10:
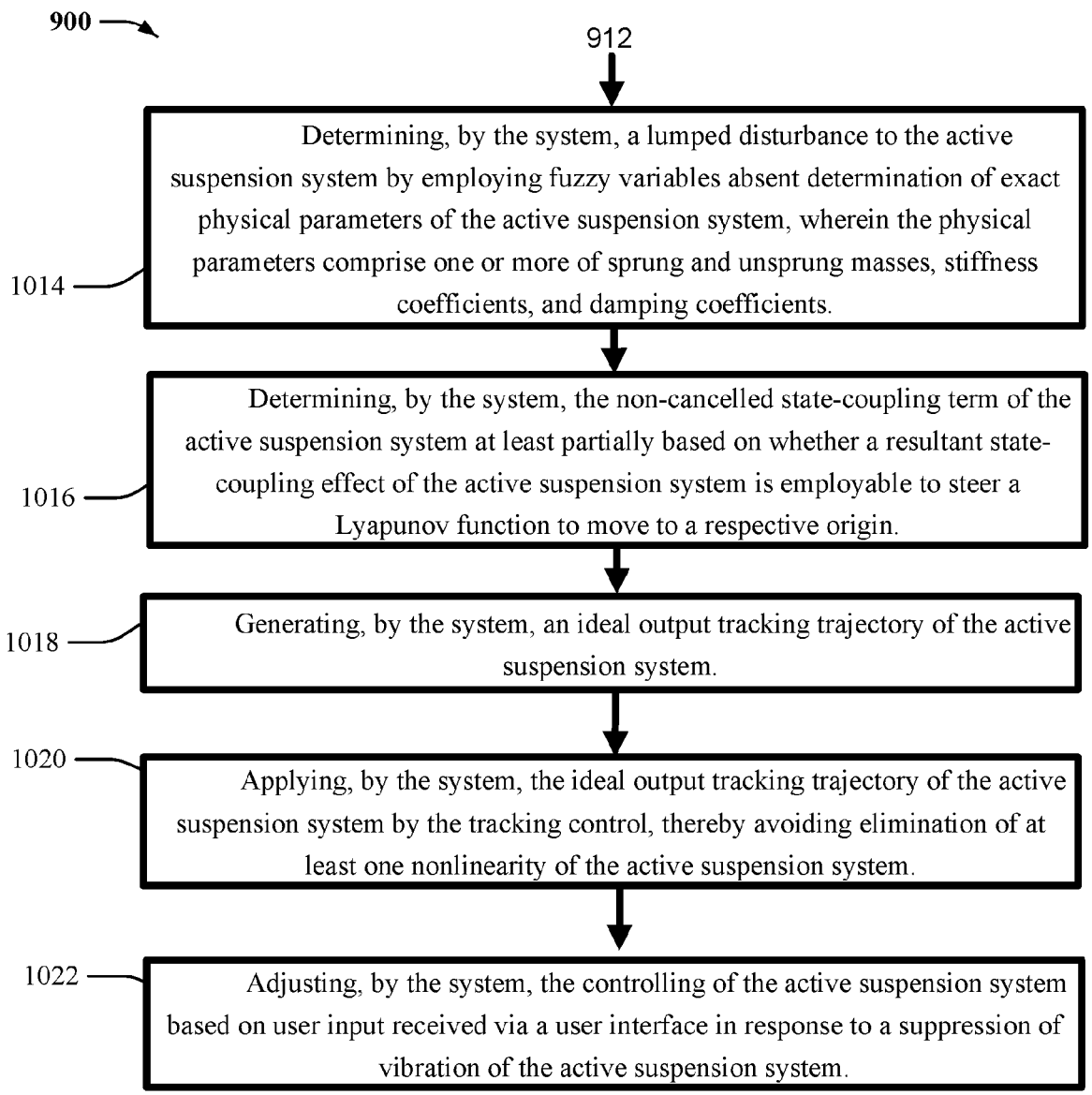
FIG. 10 illustrates a continuation of the method of use of FIG. 9, for use of the active suspension control system of FIG. 2, in accordance with one or more embodiments described herein.

Turning now to FIGS. 9 and 10, illustrated is a flow diagram of an example, non-limiting method 900 that can facilitate a process to control an active suspension system (e.g., active suspension system 280). It will be appreciated that while the non-limiting method 700 is described relative to the active suspension control system 202, the non-limiting method 700 can be applicable to the active suspension control system 102, and/or other embodiments described herein but not particularly illustrated. Repetitive description of like elements and/or processes employed in respective embodiments is omitted for sake of brevity.

Looking first to operation 902 at FIG. 9, the non-limiting method 900 can comprise employing, by a system operatively coupled to a processor (e.g., dynamics model generator 214), nonlinear dynamics usable to nonlinearly suppress vibration of an active suspension system (e.g., suspension system 280).

At operation 904, the non-limiting method 900 can comprise analyzing, by the system (e.g., state-coupling effect component 218), a state-coupling effect of the active-suspension system.

At operation 906, the non-limiting method 900 can comprise relating, by the system (e.g., controller 220 and/or dynamics model generator 214), amplitude and directionality, of disturbances to the active suspension system, to a tracking control cooperating with the active suspension system.

At operation 908, the non-limiting method 900 can comprise controlling, by the system (e.g., controller 220), the active suspension system to thereby suppress the vibration of the active suspension system, based on the nonlinear dynamics and a non-cancelled state-coupling term that is output from the state-coupling effect analysis.

At operation 910, the non-limiting method 900 can comprise generating, by the system (e.g., state-coupling effect component 218), as part of the state-coupling effect analysis, disturbance indicators and state-coupling effect indicators for the active suspension system.

At operation 912, the non-limiting method 900 can comprise relating, by the system (e.g., controller 220), the disturbance indicators and the state-coupling effect indicators to one or more effects of the disturbance indicators and the state-coupling effect indicators on the active suspension system, where the disturbance indicators and the state-coupling effect indicators have not been eliminated via control of the active suspension system.

At operation 1014 (FIG. 10), the non-limiting method 900 can comprise determining, by the system (e.g., fuzzy disturbance observer component 216), a lumped disturbance to the active suspension system by employing fuzzy variables absent determination of exact physical parameters of the active suspension system. The physical parameters can comprise one or more of sprung and unsprung masses, stiffness coefficients, and damping coefficients.

At operation 1016, the non-limiting method 900 can comprise determining, by the system (e.g., state-coupling effect component 218), the non-cancelled state-coupling term of the active suspension system at least partially based on whether a resultant state-coupling effect of the active suspension system is employable to steer a mathematical function (e.g., Lyapunov function) to move a respective origin.

At operation 1018, the non-limiting method 900 can comprise generating, by the system (e.g., controller 220), an ideal output tracking trajectory of the active suspension system.

At operation 1020, the non-limiting method 900 can comprise applying, by the system (e.g., controller 220), the ideal output tracking trajectory of the active suspension system by the tracking control, thereby avoiding elimination of at least one nonlinearity of the active suspension system.

At operation 1022, the non-limiting method 900 can comprise adjusting, by the system (e.g., controller 220), the controlling of the active suspension system based on user input via a user interface in response to a suppression of vibration of the active suspension system.

SUMMARY

In summary, one or more systems, methods and/or non-transitory, machine-readable mediums are described herein for controlling a suspension system. An active suspension control system can comprise a memory that stores executable components, and a processor, coupled to the memory, that executes or facilitates execution of the executable components comprising a dynamics model generator that generates a bioinspired dynamics model and determines nonlinear dynamics for nonlinear suppression of vibration of an active suspension system, a fuzzy disturbance observer component that determines a lumped disturbance to the active suspension system by employing fuzzy variables absent determination of exact physical parameters of the active suspension system, and a controller that applies respective outputs of the dynamics model generator and the fuzzy disturbance observer component, in combination with a non-cancelled state-coupling term, to control the active suspension system to thereby cause the nonlinear suppression of the vibration of the active suspension system.

An advantage of the aforementioned system, non-transitory machine-readable medium, and/or method can be better ride comfort in a desired frequency range and in transient response. The control effort can be small in amplitude and smoother in the control signal of less high frequency components. Energy cost can be reduced, such as up to 80% as compared to existing frameworks. Further, physical constraints, including suspension space and dynamic tire load, can be confined to permitted and/or standard-based scopes.

The aforementioned system, non-transitory machine-readable medium, and/or method can further have one or more additional, and/or alternative, benefits, advantages, uses, desirable features and/or the like. For example, one or more embodiments described herein can allow for low cost and/or low skill barrier for creating interactive events. As compared to conventional systems, the one or more embodiments describe herein can save a user entity time, labor, and/or money for building interactive events relative to an AR/RW integrated environment system. Such integrations can enhance interdisciplinary communication in early-stage design. The system also can allow for self-evaluation and self-validation of function of the interactive event. That is, the one or more embodiments described herein can be employed without complex physical components, materials, and/or sensors to test ideas in an interactive manner. Indeed, one or more embodiments described herein provide a coding-free tool, reducing learning cost and facilitating a low barrier of entry.

Indeed, a practical application of the systems, computer-implemented methods, and/or computer program products described herein can be better ride comfort coupled with use of disturbance and state-coupling indicators, absent complete elimination thereof, to also reduce energy consumption of an active suspension system. Overall, such computerized tools can constitute a concrete and tangible technical improvement in the field of suspension control systems, without being limited thereto.

One or more embodiments described herein can be inherently and/or inextricably tied to computer technology and cannot be implemented outside of a computing environment. For example, one or more processes performed by one or more embodiments described herein can more efficiently, and even more feasibly, provide program and/or program instruction execution, such as relative to active suspension control systems, as compared to existing systems and/or techniques lacking such approach(es). Systems, computer-implemented methods, and/or computer program products enabling performance of these processes are of great utility in the field of suspension control and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately, and/or effectively electronically control an active suspension system, as the one or more embodiments described herein can provide this process. Further, a human, or even thousands of humans, cannot efficiently, accurately, and/or effectively electronically control an active suspension system, as the one or more embodiments described herein can provide these processes. And, neither can the human mind nor a human with pen and paper effectively electronically achieve, provide and/or execute such processes, as conducted by one or more embodiments described herein.

In one or more embodiments, one or more of the processes and/or frameworks described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, cloud computing systems, computer architecture, and/or another technology.

One or more embodiments described herein can be fully operational towards performing one or more other functions (e.g., fully powered on, fully executed and/or another function) while also performing one or more of the one or more operations described herein.

Example Operating Environment

Figure 11:
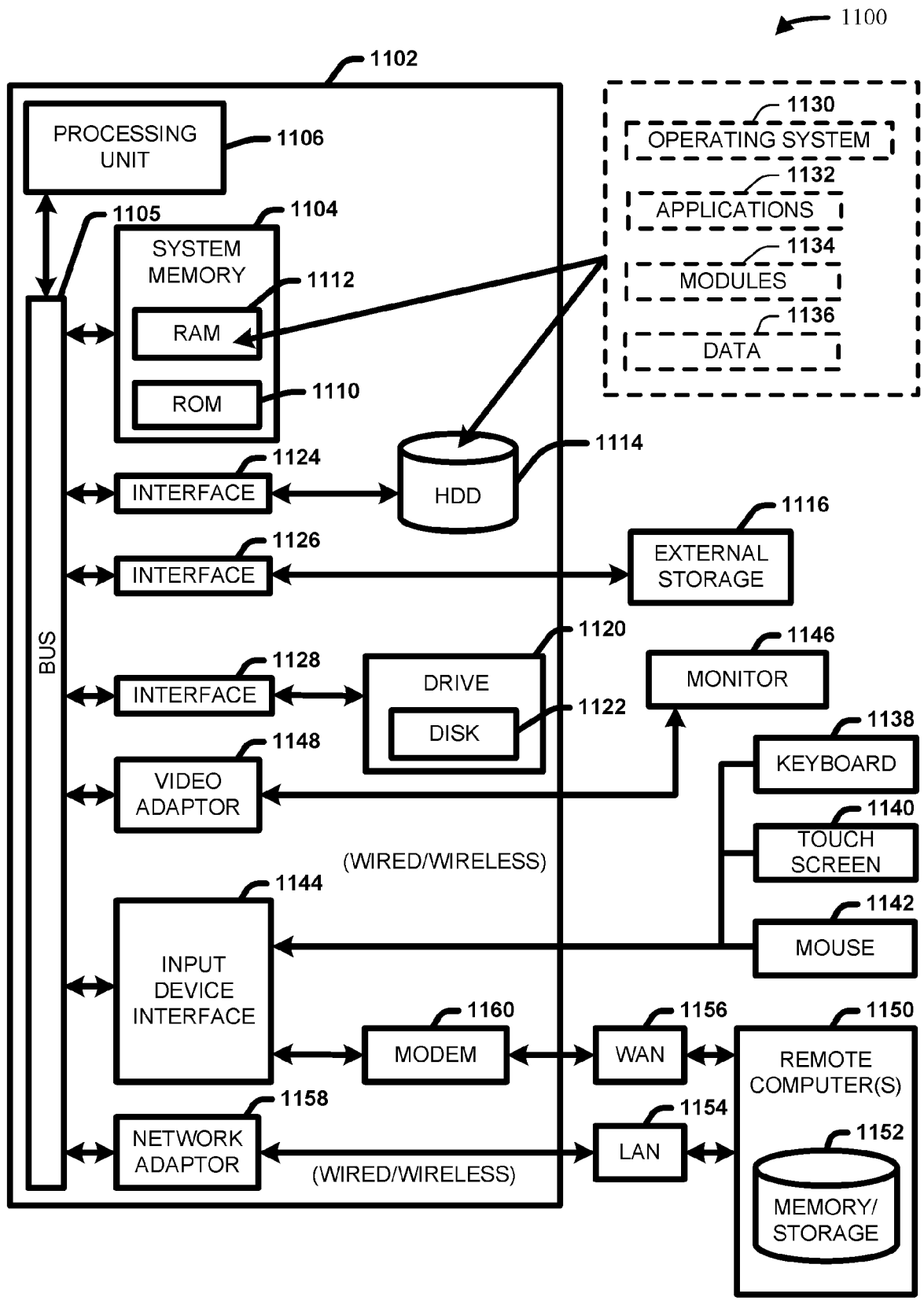
FIG. 11 illustrates a block diagram of an example, non-limiting, operating environment in which one or more embodiments described herein can be operated.
Figure 12:
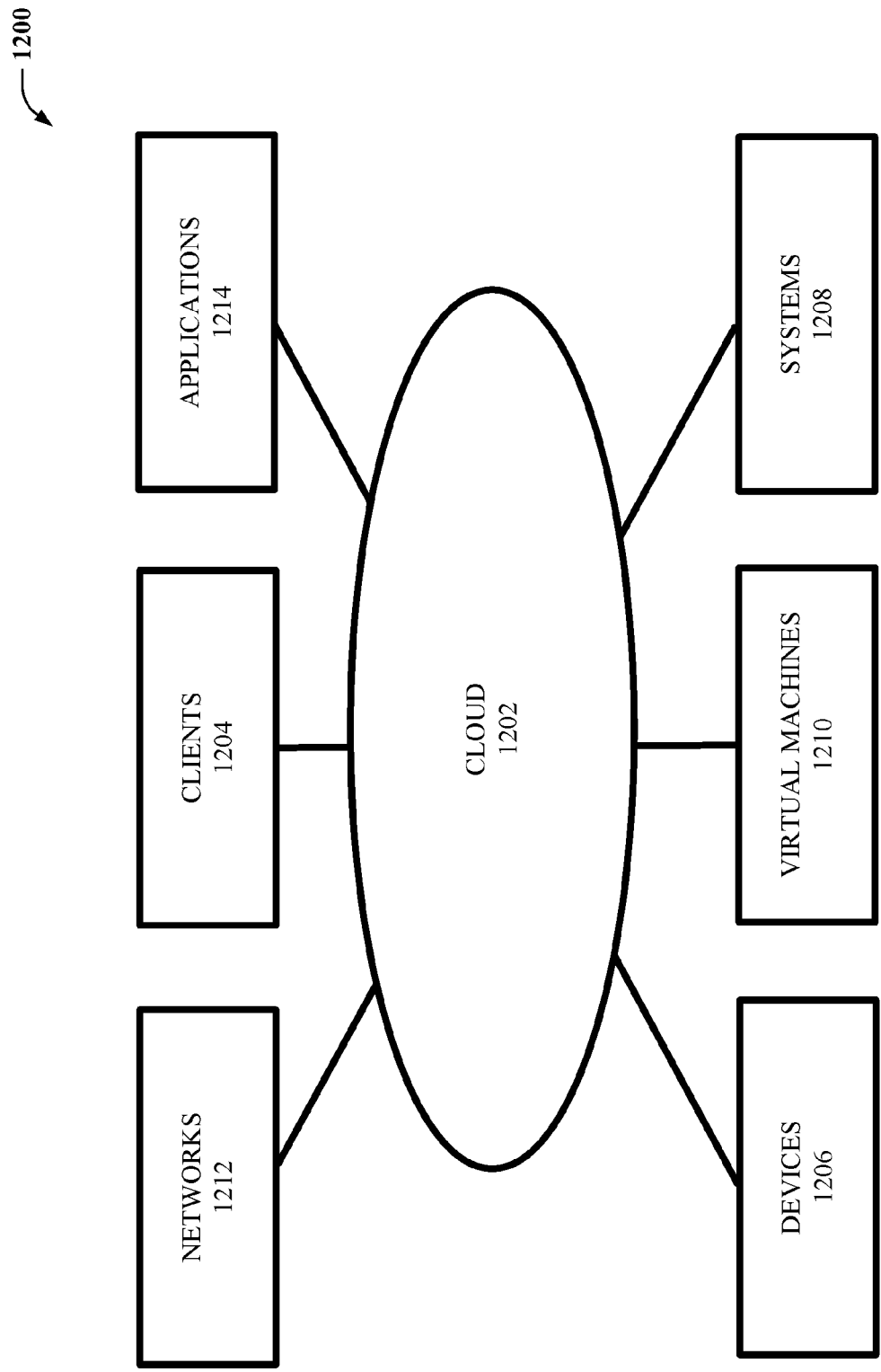
FIG. 12 illustrates a block diagram of an example, non-limiting, cloud computing environment in accordance with one or more embodiments described herein.

Turning next to FIGS. 11 and 12, a detailed description is provided of additional context for the one or more embodiments described herein at FIGS. 1-10.

FIG. 11 and the following discussion are intended to provide a brief, general description of a suitable operating environment 1100 in which one or more embodiments described herein at FIGS. 1-10 can be implemented. For example, one or more components and/or other aspects of embodiments described herein can be implemented in or be associated with, such as accessible via, the operating environment 1100. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD), and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory, and/or computer-readable media that are not only propagating transitory signals per se.

Computer-readable storage media can be accessed by one or more local or remote computing devices, e.g., via access requests, queries, and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared, and/or other wireless media.

With reference still to FIG. 11, the example operating environment 1100 for implementing one or more embodiments of the aspects described herein can include a computer 1102, the computer 1102 including a processing unit 1106, a system memory 1104 and/or a system bus 1105. One or more aspects of the processing unit 1106 can be applied to processors such as 106 and/or 206 of the non-limiting systems 100 and/or 200. The processing unit 1106 can be implemented in combination with and/or alternatively to processors such as 106 and/or 206.

Memory 1104 can store one or more computer and/or machine readable, writable and/or executable components and/or instructions that, when executed by processing unit 1106 (e.g., a classical processor, and/or like processor), can provide performance of operations defined by the executable component(s) and/or instruction(s). For example, memory 1104 can store computer and/or machine readable, writable, and/or executable components and/or instructions that, when executed by processing unit 1106, can provide execution of the one or more functions described herein relating to non-limiting system 100 and/or non-limiting system 200, as described herein with or without reference to the one or more figures of the one or more embodiments.

Memory 1104 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM), and/or the like) that can employ one or more memory architectures.

Processing unit 1106 can comprise one or more types of processors and/or electronic circuitry (e.g., a classical processor and/or like processor) that can implement one or more computer and/or machine readable, writable and/or executable components and/or instructions that can be stored at memory 1104. For example, processing unit 1106 can perform one or more operations that can be specified by computer and/or machine readable, writable, and/or executable components and/or instructions including, but not limited to, logic, control, input/output (I/O), arithmetic, and/or the like. In one or more embodiments, processing unit 1106 can be any of one or more commercially available processors. In one or more embodiments, processing unit 1106 can comprise one or more central processing unit, multi-core processor, microprocessor, dual microprocessors, microcontroller, System on a Chip (SOC), array processor, vector processor, and/or another type of processor. The examples of processing unit 1106 can be employed to implement one or more embodiments described herein.

The system bus 1105 can couple system components including, but not limited to, the system memory 1104 to the processing unit 1106. The system bus 1105 can comprise one or more types of bus structure that can further interconnect to a memory bus (with or without a memory controller), a peripheral bus, and/or a local bus using one or more of a variety of commercially available bus architectures. The system memory 1104 can include ROM 1110 and/or RAM 1112. A basic input/output system (BIOS) can be stored in a non-volatile memory such as ROM, erasable programmable read only memory (EPROM) and/or EEPROM, which BIOS contains the basic routines that help to transfer information among elements within the computer 1102, such as during startup. The RAM 1112 can include a high-speed RAM, such as static RAM for caching data.

The computer 1102 can include an internal hard disk drive (HDD) 1114 (e.g., EIDE, SATA), one or more external storage devices 1116 (e.g., a magnetic floppy disk drive (FDD), a memory stick or flash drive reader, a memory card reader and/or the like) and/or a drive 1120, e.g., such as a solid state drive or an optical disk drive, which can read or write from a disk 1122, such as a CD-ROM disc, a DVD, a BD and/or the like. Additionally, and/or alternatively, where a solid state drive is involved, disk 1122 could not be included, unless separate. While the internal HDD 1114 is illustrated as located within the computer 1102, the internal HDD 1114 can also be configured for external use in a suitable chassis (not shown). Additionally, while not shown in operating environment 1100, a solid state drive (SSD) can be used in addition to, or in place of, an HDD 1114. The HDD 1114, external storage device(s) 1116 and drive 1120 can be connected to the system bus 1105 by an HDD interface 1124, an external storage interface 1126 and a drive interface 1128, respectively. The HDD interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1112, including an operating system 1130, one or more applications 1132, other program modules 1134 and/or program data 1136. All or portions of the operating system, applications, modules, and/or data can also be cached in the RAM 1112. The systems and/or methods described herein can be implemented utilizing one or more commercially available operating systems and/or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In a related embodiment, operating system 1130 can comprise one virtual machine (VM) of multiple VMs hosted at computer 1102. Furthermore, operating system 1130 can provide runtime environments, such as the JAVA runtime environment or the .NET framework, for applications 1132. Runtime environments are consistent execution environments that can allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and/or settings for an application.

Further, computer 1102 can be enabled with a security module, such as a trusted processing module (TPM). For instance, with a TPM, boot components hash next in time boot components and wait for a match of results to secured values before loading a next boot component. This process can take place at any layer in the code execution stack of computer 1102, e.g., applied at application execution level and/or at operating system (OS) kernel level, thereby enabling security at any level of code execution.

An entity can enter and/or transmit commands and/or information into the computer 1102 through one or more wired/wireless input devices, e.g., a keyboard 1138, a touch screen 1140 and/or a pointing device, such as a mouse 1142. Other input devices (not shown) can include a microphone, an infrared (IR) remote control, a radio frequency (RF) remote control, and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 1106 through an input device interface 1144 that can be coupled to the system bus 1105, but can be connected by other interfaces, such as a parallel port, an IEEE 1394 serial port, a game port, a USB port, an IR interface, a BLUETOOTH® interface, and/or the like.

A monitor 1146 or other type of display device can be alternatively and/or additionally connected to the system bus 1105 via an interface, such as a video adapter 1148. In addition to the monitor 1146, a computer typically includes other peripheral output devices (not shown), such as speakers, printers, and/or the like.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device and/or other common network node, and typically includes many or all of the elements described relative to the computer 1102, although, for purposes of brevity, only a memory/storage device 1152 is illustrated. Additionally, and/or alternatively, the computer 1102 can be coupled (e.g., communicatively, electrically, operatively, optically and/or the like) to one or more external systems, sources, and/or devices (e.g., computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and/or non-proprietary communication protocols. In a related example, one or more embodiments described herein can include hardware (e.g., a central processing unit (CPU), a transceiver, a decoder, and/or the like), software (e.g., a set of threads, a set of processes, software in execution and/or the like) and/or a combination of hardware and/or software that provides communicating information among one or more embodiments described herein and external systems, sources, and/or devices (e.g., computing devices, communication devices and/or the like).

The logical connections depicted include wired/wireless connectivity to a local area network (LAN) 1154 and/or larger networks, e.g., a wide area network (WAN) 1156. LAN and WAN networking environments can be commonplace in offices and companies and can provide enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can provide wired and/or wireless communication to the LAN 1154, which can also include a wireless access point (AP) disposed thereon for communicating with the adapter 1158 in a wireless mode.

When used in a WAN networking environment, the computer 1102 can include a modem 1160 and/or can be connected to a communications server on the WAN 1156 via other means for establishing communications over the WAN 1156, such as by way of the Internet. The modem 1160, which can be internal and/or external and a wired and/or wireless device, can be connected to the system bus 1105 via the input device interface 1144. In a networked environment, program modules depicted relative to the computer 1102 or portions thereof can be stored in the remote memory/storage device 1152. The network connections shown are merely exemplary and one or more other means of establishing a communications link among the computers can be used.

When used in either a LAN or WAN networking environment, the computer 1102 can access cloud storage systems or other network-based storage systems in addition to, and/or in place of, external storage devices 1116 as described above, such as but not limited to, a network virtual machine providing one or more aspects of storage and/or processing of information. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, such as with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices and/or entities operatively disposed in wireless communication, e.g., a printer, scanner, desktop, and/or portable computer, portable data assistant, communications satellite, telephone, and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a pre-defined structure as with a conventional network or simply an ad hoc communication between at least two devices.

The illustrated embodiments described herein can be employed relative to distributed computing environments (e.g., cloud computing environments), such as described below with respect to FIG. 12, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1202 described below with reference to illustration 1200 of FIG. 12. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting systems 100 and/or 200, and/or the example operating environment 1100 of FIG. 11, can be associated with and/or be included in cloud-based and/or partially-cloud-based system.

Referring now to details of one or more elements illustrated at FIG. 12, the illustrative cloud computing environment 1202 is depicted. Cloud computing environment 1202 can comprise one or more cloud computing nodes, virtual machines, and/or the like with which local computing devices used by cloud clients 1204, such as for example via one or more devices 1206, systems 1208, virtual machines 1210, networks 1212, and/or applications 1214.

The one or more cloud computing nodes, virtual machines and/or the like can be grouped physically or virtually, in one or more networks, such as local, distributed, private, public clouds, and/or a combination thereof. The cloud computing environment 1202 can provide infrastructure, platforms, virtual machines, and/or software for which a client 1204 does not maintain all or at least a portion of resources on a local device, such as a computing device. The various elements 1206 to 1212 are not intended to be limiting and are but some of various examples of computerized elements that can communicate with one another and/or with the one or more cloud computing nodes via the cloud computing environment 1202, such as over any suitable network connection and/or type.

CONCLUSION

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures, and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. An active suspension control system, comprising:
   at least one memory that stores executable components; and
   at least one processor, coupled to the at least one memory, that executes or facilitates execution of the executable components, the executable components comprising:
      a dynamics model generator that generates a bioinspired dynamics model and determines nonlinear dynamics for nonlinear suppression of vibration of an active suspension system;
      a fuzzy disturbance observer component that determines a lumped disturbance to the active suspension system by employing fuzzy variables absent determination of exact physical parameters of the active suspension system;
      a state-coupling effect indicator component that analyzes a state-coupling effect of the active suspension system by relating amplitude and directionality of disturbances to the active suspension system to a tracking control cooperating with the active suspension system; and
      a controller that applies respective outputs of the dynamics model generator and the fuzzy disturbance observer component, in combination with a non-cancelled state-coupling term, to control the active suspension system to thereby cause the nonlinear suppression of the vibration of the active suspension system.

2. The system of claim 1, wherein the dynamics model generator outputs nonlinear stiffness and damping properties for application by the controller to use for the nonlinear suppression of the vibration of the active suspension system.

3. The system of claim 1, wherein the dynamics model generator employs the bioinspired dynamics model by maintaining displacement of sprung and unsprung masses of the active suspension system within defined thresholds.

4. The system of claim 1, wherein the physical parameters comprise sprung and unsprung masses, stiffness coefficients and damping coefficients.

5. The system of claim 1, wherein the fuzzy disturbance observer component determines the lumped disturbance based on a positive control gain and a calculated disturbance observation error, and by applying a reconstruction error to an estimated lumped disturbance determined by the fuzzy disturbance observer component.

6. The system of claim 1, wherein the state-coupling effect indicator component determines the non-cancelled state-coupling term at least partially based on whether a resultant state-coupling effect of the active suspension system is able to be employed to steer a Lyapunov function to move to a respective origin.

7. The system of claim 1, wherein the output of the dynamics model generator is applied as an ideal output tracking trajectory of the active suspension system by the controller, and wherein application of the output avoids elimination of at least one nonlinearity of the active suspension system.

8. A non-transitory machine-readable medium, comprising executable instructions that, when executed by a processor facilitate performance of operations, comprising:
   employing nonlinear dynamics for nonlinearly suppressing vibration of an active suspension system and to generate an ideal output tracking trajectory of the active suspension system;
   generating both disturbance and state-coupling effect indicators for the active suspension system;
   relating the disturbance and state-coupling effect indicators to one or more effects of the disturbance and state-coupling effect indicators on the active suspension system, where the disturbance and state-coupling effect indicators have not been eliminated via control of the active suspension system; and
   controlling the active suspension system based on the nonlinear dynamics and based on the disturbance and state-coupling effect indicators.

9. The non-transitory machine-readable medium of claim 8, wherein the operations further comprise:
   eliminating one or more of the disturbance and state-coupling effect indicators via one or more introduced binary trigger conditions.

10. The non-transitory machine-readable medium of claim 8,
    wherein the employing of the nonlinear dynamics for the nonlinearly suppressing of the vibration of the active suspension system to generate the ideal output tracking trajectory of the active suspension system avoids elimination of at least one nonlinearity of the active suspension system.

11. The non-transitory machine-readable medium of claim 8, wherein the operations further comprise:
determining a lumped disturbance to the active suspension system by employing fuzzy variables absent determination of exact physical parameters of the active suspension system.

12. The non-transitory machine-readable medium of claim 11, wherein the operations further comprise:
determining the lumped disturbance based on a positive control gain and a calculated disturbance observation error, and by applying a reconstruction error to an estimated lumped disturbance.

13. The non-transitory machine-readable medium of claim 8, wherein the operations further comprise:
analyzing a state-coupling effect of the active suspension system by relating amplitude and directionality of disturbances to the active suspension system to a tracking control cooperating with the active suspension system.

14. A method, comprising:
employing, by a system comprising a processor, nonlinear dynamics usable to nonlinearly suppress vibration of an active suspension system;
analyzing, by the system, a state-coupling effect of the active suspension system by relating amplitude and directionality, of disturbances to the active suspension system, to a tracking control cooperating with the active suspension system; and
controlling, by the system, the active suspension system to thereby suppress the vibration of the active suspension system, based on the nonlinear dynamics and a non-cancelled state-coupling term that is output from the state-coupling effect analysis.

15. The method of claim 14, further comprising:
as part of the analyzing of the state-coupling effect, generating, by the system, disturbance indicators and state-coupling effect indicators for the active suspension system.

16. The method of claim 14, further comprising:
determining, by the system, a lumped disturbance to the active suspension system by employing fuzzy variables absent determination of exact physical parameters of the active suspension system, wherein the physical parameters comprise one or more of sprung and unsprung masses, stiffness coefficients and damping coefficients.

17. The method of claim 14, further comprising:
determining, by the system, the non-cancelled state-coupling term of the active suspension system at least partially based on whether a resultant state-coupling effect of the active suspension system is employable to steer a Lyapunov function to move to a respective origin.

18. The method of claim 14, further comprising:
generating, by the system, an ideal output tracking trajectory of the active suspension system; and
applying, by the system, the ideal output tracking trajectory of the active suspension system by the tracking control, thereby avoiding elimination of at least one nonlinearity of the active suspension system.

19. The method of claim 14, further comprising:
adjusting, by the system, the controlling of the active suspension system based on user input received via a user interface in response to a suppression of the vibration of the active suspension system.

20. The method of claim 15, further comprising:
relating, by the system, the disturbance indicators and the state-coupling effect indicators to one or more effects of the disturbance indicators and the state-coupling effect indicators on the active suspension system, wherein the disturbance indicators and the state-coupling effect indicators have not been eliminated via control of the active suspension system.

* * * * *